United States Patent [19]
Simmons

[11] Patent Number: 5,881,428
[45] Date of Patent: Mar. 16, 1999

[54] WINDSHIELD AND WINDSHIELD WIPER HEATING APPARATUS ASSEMBLY

[76] Inventor: David L. Simmons, P.O. Box 4112, Sevierville, Tenn. 37864-4112

[21] Appl. No.: 880,562

[22] Filed: Jun. 23, 1997

Related U.S. Application Data

[63] Continuation-in-part of Ser. No. 603,921, Feb. 22, 1996, Pat. No. 5,676,868.
[51] Int. Cl.$^6$ .................................. B60S 1/48; B60S 1/52
[52] U.S. Cl. ..................................... 15/250.04; 15/250.05; 15/250.32; 239/284.1; 239/130
[58] Field of Search ............................ 15/250.04, 250.02, 15/250.01, 250.07, 250.05, 250.32; 239/284.1, 284.2, 130; 219/202

[56] References Cited

U.S. PATENT DOCUMENTS

| | | | |
|---|---|---|---|
| 3,321,792 | 5/1967 | Senkewich | 15/250.04 |
| 3,371,368 | 3/1968 | Walter | 15/250.04 |
| 3,447,186 | 6/1969 | Senkewich | 15/250.04 |
| 4,060,872 | 12/1977 | Bucklitzsch | 15/250.04 |
| 4,339,839 | 7/1982 | Knights | 15/250.04 |
| 4,959,882 | 10/1990 | Henderson et al. | 15/250.04 |
| 5,412,177 | 5/1995 | Clark | 15/250.07 |

FOREIGN PATENT DOCUMENTS

| | | | |
|---|---|---|---|
| 3603468 | 8/1987 | Germany | 15/250.04 |
| 59-92237 | 5/1984 | Japan | 15/250.04 |
| 2085288 | 4/1982 | United Kingdom | 15/250.04 |

*Primary Examiner*—Gary K. Graham
*Attorney, Agent, or Firm*—M. Alex Brown, Patent Attorney

[57] ABSTRACT

A heating windshield wiper shroud system which is designed to be installed in combination with a conventional motorized vehicle windshield wiper assembly having an electrically activated windshield wiper rocker arm and a windshield wiper blade and supporting frame. The wiper shroud system utilizes a shroud housing with a roof portion along a longitudinal axis having a middle section with a first vertically and transversely designed upper width portion and a second vertically and transversely designed lower width portion which has a differentially wider transverse width dimension than the first upper width portion. The second lower width has a shelf portion which has a perimeter generally between and coextensive with the outside vertical edge of the first upper width and the outer edge of the second lower width portion. The shroud housing is further provided with an internal channel long its longitudinal length for installation of a conventional wiper blade assembly, a channel transversely positioned within the upper width of the middle section for receipt of a pin securing a wiper arm, and a channel transversely positioned within the lower width for pinned securement of a wiper blade. Biasable clip means are utilized adjacent to the transverse channels to secure pin members; and a perforated duct tubing system positionally oriented and mounted adjacent to the roof portion of the shroud on opposite sides of the middle section to provide a heated ambient fluid directly adjacent to and above a wiper frame and blade assembly installed in the shroud housing.

21 Claims, 24 Drawing Sheets

WINDSHIELD AND WINDSHIELD WIPER HEATING APPARATUS ASSEMBLY

This is a continuation-in-part of Ser. No. 08/603,921, Filed Feb. 22, 1996 now U.S. Pat. No. 5,676,868.

BACKGROUND INFORMATION

Typical of the prior art references regarding heated and adjacent area surfaces of a vehicle windshield, for use in an anutomotive vehicle are U.S. Pat. Nos. 5,325,561; 4,928,345; 4,670,933; 4,603,451; 4,497,083; 4,360,941; 3,619,556; 3,447,186; U.S. Pat. No. Des. 342,225; U.S. Pat. No. Des. 341,115; U.S. Pat. No. Des. 324,014; issued respectively to Kotlar, Meltzer et al., Toplensky, VanSickle, Nielsen, Jr. et al., Mabie, Delbel et al., Senkewich Heckman et al., Papania, and Runiner; each of which was located during the course of a patent search; each being enclosed by full or gazette copy with the application herein as filed pursuant to Rule regarding disclosure of prior art.

The Senkewich '186 patent discloses "a windshield wiper in the form of an almost closed elongated box or collector into which hot air or a liquid medium enters" (Senkewich, Col. 1, lines 42–44). the present invention operates on the basis of a very differently constructed "open-ended shroud housing subassembly." Additionally, it will be noted that Senkewich does not utilize or work in combination with a truly conventional wiper blade unit as is the case in the present invention; but, instead, utilizes a specially adopted wiper blade; its element 15, which is differently installed and retained, from the present invention, by three (3) stops (element 18 therein) and spring clamps (element 19) (Senkewich, Col. 2, lines 41–50). Other significant differences will be noted in the Senkewich reference from the present invention, such as the means for installment in reference to a conventional wiper arm and wiper frame and blade assembly, the structure and positional orientation of the perforated duct means and heated fluid entry port, and the heating and pump assembly means of the present invention.

The Kotlar '561 patent discloses a windshield wiper assembly having a thin heater wire structured within the length of a flexible wiper blade, with the wiper blade being enclosed within a flexible cover which defines a dead air space heated somewhat by the heater element in the wiper blade. This device is not ment to be utilized with or replaceable by a conventional wiper blade, as in the case of the present invention, nor does the cover otherwise support any type of heating means.

Additionally, there have been many attempts to improve the wiping function of a windshield wiper in cleaning the outer surface of a windshield in cold weather; and various efforts in attempting to solve the problem of providing proper wiping performance in extremely frigid, snowy or icy conditions while also removing and keeping the wiper blade, frame and linkages free from interference by ice and snow, or otherwise flexible such that a special wiper blade would function on the surface of the vehicle windshield.

In this regard, the Meltzer et al. '345 patent discloses another of many specially adopted wiper blade assemblies wherein the electrical heating and resistence means is provided within the special blade member itself, with no use disclosed or intended with conventional vehicle wiper blade assemblies already provided with the vehicle. Along these similar lines the Ruminer U.S. Pat. No. Des. '014 patent discloses a design for a heated windshield wiper.

The Nielsen et al. '083 patent discloses a heated windshield wiper blade having a resistance wire running along the length of the wiper arm, the blade carrier and the wiper blade for the purpose of heating the blade and the carrier when it is connected to a vehicle's electrical system. In Nielsen, the path through which the heating-resistance wire travels, and the various associated connections, are reasonable complex for satisfying the purpose therein of providing the blade, which, in that case, is a non-conventional replaceable blade, with a function of being independently replaced in reference to its arm and carrier.

The Mabie '941 patent discloses a fairly complex windshield wiper assembly which incorporates a weather protective hood utilizing electrical conductors affixed on the outer wall of the hood and other conductors affixed on the inner wall of the hood to heat the hood and frame of this device to prevent the accumulation of ice.

The Deibel et al. '556 patent discloses a heated windshield wiper blade, described as an electrically heated weatherproof wiper blade. Deibel is, therefore, in the genre of the prior art where a specially adopted wiper blade element is provided with the device. Disclosed is a windshield wiper blade and arm assembly in which the blade has a pressure-distributing superstructure including a number of pivotally connected levers and a flexible backing strip for retaining a specially adopted rubber squeegee member. The superstructure and backing strip of Deibel are enclosed by an envelope of rubber or rubberlike material with a squeegee element extending exterior or outside of the envelope portion. The wiper blade of Deibel is provided with a heating element secreted between the squeegee member and its pressure applying and distributing frame. The envelope and the squeegee are both constructed from insulating material which, thereby, serve as electrical insulators for the heating element utilized in this invention.

The Toplenszky '933 patent discloses a wiper blade which is mounted within a mounting strip having an electrical heating resistance material therein; and the VanSickle '451 patent is of similar structure and function in disclosing a wiper assembly supported by a structure having a heating element with thermostat means. Neither Toplenszky nor VanSickle are provided with any type of heat supplied cover means; nor is either designed to be utilizable with a conventional wiper element and unit typically and conventionally provided with automobiles and trucks, or other vehicles.

Additionally, the Heckman et al. U.S. Pat. No. Des. '225 design patent discloses a wiper arm cover, which is not provided structurally or functionally with any type of pivotable or rotatable attachment means for connection to conventional wiper arm assemblies normally provided with motarized vehicles having windshields; nor is Heckman provided with heating means or moveable or pivotable attachment means for receiving a conventional wiper blade assembly. The structure, design and function are also distinguishable from that of the present invention's shroud assembly and system.

None of the references found and cited specifically illustrates the heating windshield wiper shroud system of the present invention. Nor is the present invention obvious in view of any of the prior art references listed herein. In addition, all of the relevant prior art heretofore known suffer from a number of disadvantages.

It will otherwise be indicated that none of the apparently crowded, prior art references herein teach concepts which provide a relatively simple and distinguishably improved assembly for a heated windshield wiper shroud system which provides specially bowed shroud means having a differentially spaced and widthed upper middle portion when viewed from a top view in longitudinal cross-section; so that a first upper smaller differential width spacing can receive a clippable pin to hold the shroud housing to a conventional wiper arm provided with a vehicle, and a second lower wider differential width spacing at this upper middle portion of the shroud housing can receive a second clippable pin to hold a conventional wiper blade within the shroud for heating and pivotable movement within and adjacent to the shroud of the present invention, with a heating means being supported by the internal roof portions of end portions of the shroud so that heating is provided directly above and adjacent to the installed conventional wiper blade assembly.

In the past, the prior art heated windshield wiper devices which could be utilized in any reasonable manner on conventional wiper arms provided with vehicles, have suffered from functionally and structurally deficient wiper blades, heating elements and placement and effective heating ability, ice and sludge prevention ability, wiper frame support and movement ability, covering design and shape/contour, spacing and support ability of any covering utilized. in relationship to a wiper blade, complexity and prolixity of electrical heating resistance construction and logistical placement, and the ability to be utilized reasonably, or in any manner, with already-available, conventional wiper blade units such as those provided with a vehicle; as well, otherwise, as complexity of construction.

There have been problems of design and construction in providing a covered and housed system which could both attach and be installable on both a conventional wiper arm provided as part of the construction of a vehicle and a conventional wiper blade characteristically also provided with a vehicle, being workably attached and functionally installed to each at the same time, with no specially adopted wiper blade containing an electrical heating element being necessary.

These and other disadvantages, structurally and functionally, of the prior art will become apparent in reviewing the remainder of the present specification, claims and drawings.

Accordingly, it is an object of the present invention to provide a substantially improved heating windshield wiper shroud system and assembly for installation and combination with a conventional wiper arm member and a conventional wiper blade, conventionally and characteristically provided with the same vehicle, for installable and secure use with each of these members at the same time.

It is a further object of the present invention to provide a substantially improved, simplified and more easily manufactured, heated windshield wiper shroud housing and assembly, having an improved design, contour and shape for connection and installation to and with a conventional wiper arm and wiper blade such that a conventional wiper blade is provided with adjacent support, flexible movement and heating for more efficient movement and function on the outer surface of a vehicle windshield during frigid, icy or cold weather conditions.

It is a further object of the present improved invention to provide a novelly constructed, open-ended heating apparatus with a perforated duct system and heated fluid entry port to provide positional advantages to the dissemination of heat to conventional wiper arm, wiper frame and blade assemblies and adjacent vehicle windshield components and areas thereof; and to more advantageously supply a heated ambient fluid such as hot air, gas, liquid or colloidal suspension fluid to the duct system of the specially constructed shroud housing of the present invention.

It is yet a further object of the present invention to provide a substantially improved, and otherwise novel and superior shroud housing assembly having a special middle portion differentially spaced in width longitudinally at two different vertical positions, to receive a first upper pin to secure the wiper arm unit and a second lower pin to secure a conventional wiper blade unit, with a perforated duct means for providing a heated ambient fluid being provided at first and second lateral end portions outside the middle portion of the shroud supporting the wiper arm and the wiper blade.

Additionally, it is a further object of the invention by utilization of its specially adopted shroud housing to provide easier and more efficient access vehicle-engine-generated convection currents for utilization in heating an ambient fluid such as collected air or a stored or supplied liquid fluid, for efficient communication as a heated fluid to the novel open-ended shroud housing subassembly and specially positioned perforated duct system and entry port of the present invention.

A further object of the present invention is to provide a substantially and distinguishably novel and improved heating windshield wiper shroud system and assembly which is shaped, constructed and otherwise adopted to allow, permit and assist movement of a conventional wiper blade unit on the outer surface of a vehicle windshield during icy, frigid and cold weather conditions, providing pivotable or rotional movement of the wiper blade within and adjacent to a shroud housing while providing at the same time adjacent and functional heating to the frame elements of a conventional wiper blade unit such that the wiper blade will be more flexible in more easily and functionally sliding across and over the windshield of a vehicle.

A further object is to provide a dual biasable and lockable clip means at each differential width apacing of the shroud for respective securement of the wiper arm (or wiper arm pin) and the wiper blade unit conventionally available with a vehicle.

It will, therefore, be understood that substantial and distinguishable structural and functional advantages are realized in the present invention over the prior art devices with regard to the shroud housing of the invention providing two level, locked support at differentially apaced width portions of the shroud's middle section for secure support and movement of a respective wiper arm unit and a respective wiper blade unit, conventionally provided with vehicles, and for advantageous and improved protection and adjacent heating of the wiper blade unit when in supported position within the shroud.

SUMMARY OF THE INVENTION

The foregoing and other objects of the invention can be achieved with the present invention device, assembly and system which is a heating windshield wiper shroud system which is adopted for mounting, installation and operative combination on and with a conventional motorized vehicle windshield wiper assembly having an electrically activated, moveable or pivotable windshield wiper holding arm portion and a conventionally installed, replaceable wiper blade and frame assembly portion typically provided with a pin for attachment to the conventional wiper holding arm; but also utilizable with other available prior art windshield wiper assemblies. The invention is provided with a shroud housing having a longitudinally oriented roof portion, a pair of longitudinal wall portions and a pair of width oriented end wall portions. The roof portion is provided with a middle section and first and second lateral sections. The middle section of the invention has and defines a first vertically disposed upper width and a second vertically disposed lower width, each substantially defined along the axes vertical and transverse to the longitudinal axis of the roof portion. The second vertically disposed lower width is provided with a differentially wider width dimension, transverse to the longitudinal axis, than the upper width; and in this differential relationship and design the middle section of the invention is thereby provided with at least one transversely and vertically oriented shelf portion located substantially at the lower width of the middle section of the invention. Each of the first and second longitudinally oriented lateral sections of the roof portion of the invention are concurrent and coextensive, in their perimeters, with and between the shelf portion at the lower width of the middle section and each respective first and second width oriented end wall portion. The shroud housing of the invention has and defines an inner channel for installation of a conventional wiper blade and frame assembly. Additionally, the upper width of the middle section defines a first channel for receipt and pinned securement of a conventional vehicle wiper holding arm; and the lower width of the middle section defines a second channel for receipt and pinned securement of a conventional vehicle wiper blade and frame assembly, typically available in the prior art. Perforated duct means are mounted within each of the internally spaced upper roof portions of the inner channel of the shroud, within and adjacent to each of the first and second lateral sections of the roof portion of the shroud, for providing directly above and adjacent to a novelly installed conventional wiper frame and blade assembly a heated ambient fluid supplied through the invention's heating and pump assembly means and entry port, and disseminated through the positioned holes of the invention's perforated duct system to supply a heated ambient fluid directly adjacent to and generally above an installed conventional wiper blade assembly when installed in the inner channel of the shroud of the present invention.

REFERENCE NUMBERS IN DRAWINGS

Figure 1:
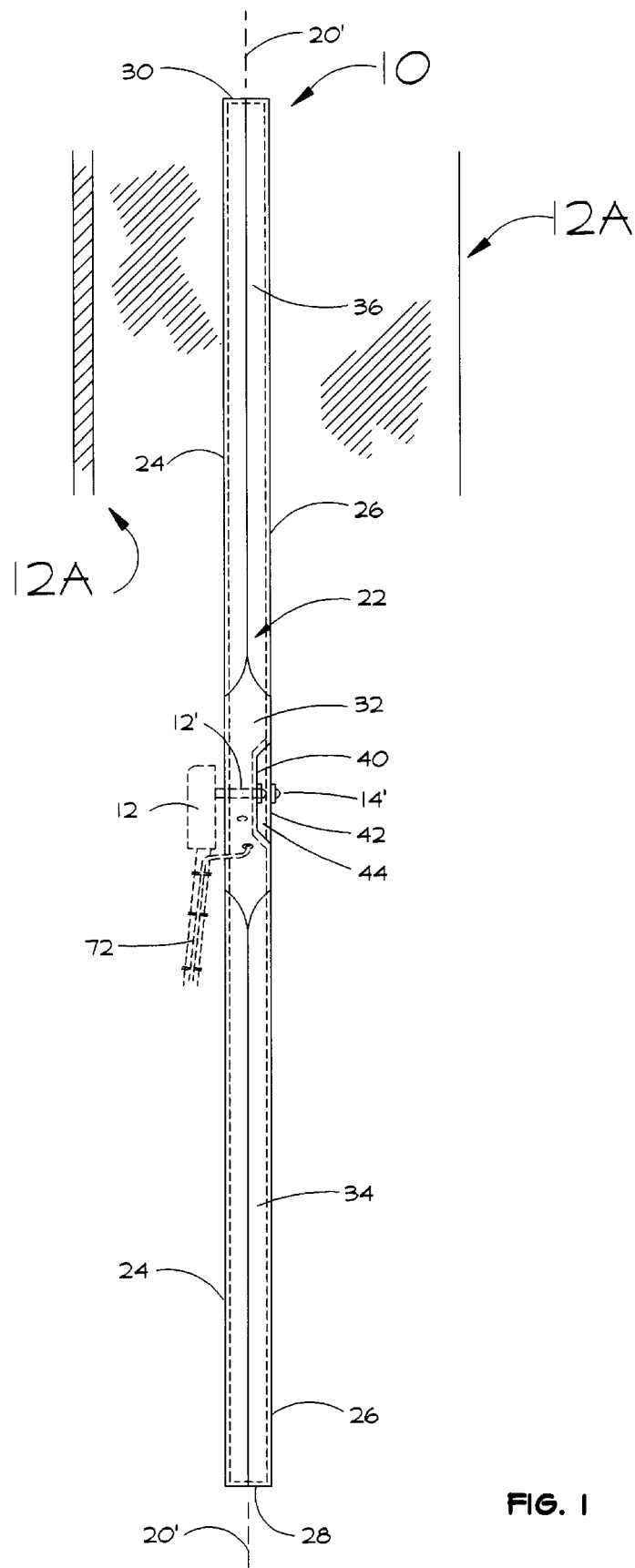
FIG. 1 is a top view of a preferred embodiment of the novel heating windshield wiper shroud system, illustrating in part one conventional motorized vehicle windshield wiper assembly; and inside wall and shelf portions of the invention.

10 Improved Windshield And Windshield Wiper Apparatus Assembly
12 Conventional Wiper Arm
12A Vehicle Windshield
$12^1$ Conventional Vehicle Wiperarm Pin
14 Conventional Wiper Blade And Frame Assembly
$14^1$ Conventional Blade Connection Pin
14a Wiper Blade Member (14)
14b Pivotable Wiper Support Frame (14)
20 Shroud Housing
$20^1$ Shroud Housing Horizontal Longitudinal Axis (20)
22 Longitudinally Oriented Roof Portion (20)
24 First Longitudinal Wall Portion (20)
26 Second Longitudinal Wall Portion (20)
28 First Width Oriented End Wall Portion (20)
30 Second Width Oriented End Wall Portion (20)
32 Middle Section (22)
$32^1$ Vertical Axis of Middle Section (22)
34 First Lateral Section (22)
34a Inside Surface (34) (46)
36 Second Lateral Section (22)
36a Inside Surface (36) (46)
40 First Vertically Disposed Upper Width Portion (32)
42 Second Vertically Disposed Lower Width Portion (32)
44 Shelf Portion (32)
46 Inner Wiper Blade Guide Channel (20)
48 First Pin-Channel (40) (32)
50 Pin-Channel (40) (32)
52 First Biasable Clip (20)
54 Second Biasable Clip (20)
80 First Parabola-Shaped Portion (52, 54)
Second Parabola-Shaped Portion (52, 54)
90 Clip Compressing Tool Opening (20) (50)
92 Offset Key Member
94 Offset Portion (92)
100 Rectangular Wall Member
102 First Wall (100)
104 Second Wall (100)
106 Third End Wall (100)
120 Curved Attachment Member (40) (20)
122 Curved Attachment End-Piece (12)
124 Cover Member
126 Spring Biased Member (124)
130 Heating Means Retaining Shield Member
152 Vehicle Engine
154 Perforated Duct System
156 Holes (of 154)
158 Heated Fluid Entry Port (of 20)
160 Heating And Pump Assembly
162 Ambient Fluid
164 Heat Exchanger Subassembly
166 Pump Subassembly
168 Inboard Communication Line (of 164)
170 Outboard Communication Line (of 164)
174 Primar Communications Line (of 166)
176 Secondary Communications Line (of 166)
178 Secondary Variable Heat Exchanger
180 Couple Member (of 176)
182 Filter Assembly (of 160)
184 Manifold Area (or portion) (of 152)
186 Liquid Fluid Line (or hose line) (of 152)
188 Exhaust Pipe Line (of 152).

DETAILED DESCRIPTION OF THE PREFERRED EMBODIMENTS OF THE INVENTION

The following description of the preferred embodiments of the concepts of this invention is made in reference to the accompanying figures.

Referring now to the drawings, and more particularly to FIGS. 1, 2, 3, 16, 17, 18, 19, 20, 21, 22, 23, 24 and 25, thereof, there is shown an improved windshield and windshield wiper heating apparatus assembly 10, of the present invention, which is constructed in accordance with the invention in being adaptable for the receipt, installation or the combined releasable attachment of a conventional motorized (windshield-bearing) vehicle windshield wiper rocker or pivotable arm 12 and a conventional vehicle windshield wiper blade member 14a and supporting frame assembly 14, resting on the vehicle windshield 12A, depicted in the drawings for illustration purposes.

A conventional wiper blade and frame assembly in the present art is characteristically provided with a rubber-like wiper blade member 14a, normally flexible in temperatures (and weather conditions) above those considered to be frigid, freezing or below the freezing point for the material used in constructing the blade member 14a; and a pivotable wiper support frame 14b which is connected to and supports the blade 14a, and allows it to flex or change longitudinal configuration in adjusting to the contour of a vehicle windshield 12A.

There are several significant, conventional windshield wiper arms 12 presently known and substantially utilized in the present prior art, as illustrated by example, for use for the present invention, in FIGS. 1, 2, 3, 5, 6, 8, 9, 17, 20, 21, 22, 23, 24 and 25. It will be appreciated that though these several examples of wiper arms 12 are illustrated, that the concepts and spirit of the invention will allow the present invention to be utilized in combination and installed attachment with a diverse range and number of wiper arms 12, both available in the present art and in the future art in this technology.

A number of conventional windshield wiper assemblies are known in the art having a moveable wiper arm holding a replaceable wiper blade and supporting frame unit. The wiper arm of this conventional assembly is characteristically powered by an electric motor activated by the D.C. power vehicle battery in a vehicle. The mechanical interface often involves: battery, wiring, electric motor, motor shaft, worm gear, crank, connecting rod, rack, pinion and wiper blade arm. The wiper arm depends on the crank to move it to and fro in pivotable motion. A worm gear reduces the motor speed, and the crank moves a rack of linking rod that drives the wiper blades in many vehicle wiper assemblies.

The teaching of the present invention permits the novel preferred embodiments of the shroud system 10 to fit, and be utilized in combination with, most types of wiper arm assemblies which are available and standard with various motorized vehicles manufactured, as illustrated in FIGS. 1, 2, 3, 5, 6, 8, 9, 17, 20, 21, 22, 23, 24 and 25. The types of conventional wiper rocker, support arms presently available include, but are not limited to substantially: (a) those having pin installment end-portions, (b) those having couplable male-female receiving means for receiving a couplable rocker arm end flange member already attached to a windshield wiper characteristically used with this type of wiper arm, and (c) those having a curved attachment loop end; as illustrated generally in the above referenced drawings.

In a preferred embodiment of the invention the shroud system 10 of the present invention is provided with a shroud housing 20. This housing 20 is provided with a longitudinally oriented roof portion 22; a first longitudinal wall portion 24 and a second longitudinal wall portion 26, generally parallel to one another and connected by attachment or integrally to the roof portion 22; and a first width-oriented end wall portion 28 and a second width-oriented end wall portion 30, also, each, attached to the roof portion 22 and placed at opposite ends to one another on the shroud 20.

The roof portion 22 has a middle section 32 in its construction in accordance with the present invention, and is also provided with a first lateral section 34 and a second lateral section 36. The middle section 32 is also constructed in contour and shape to have and define along its vertical axis $32^1$; i.e., on the axis vertical to the shroud housing's horizontal-longitudinal axis $20^1$; a first vertically disposed upper width portion 40 and a second vertically disposed lower width portion 42. In this teaching of the present invention, the two width portions 40 and 42 have a differential dimensional width relationship to each other, the second lower width portion 42 being wider in width dimension than the first upper width portion 40. Because of this differential dimensional relationship, the middle section 32 has in the teaching of this design of the invention at least one vertically oriented or disposed shelf portion 44 located at the vertical position of the second lower width 42.

In a preferred embodiment of the invention, as illustrated in FIGS. 1, 5, 6, 8, 9, 11, 12, 14 and other drawings; the first lateral section 34 and the second lateral section 36 of the roof portion 22 of the shroud housing 20 are concurrent and coextensive, that is, joining each other in their upper vertical boundaries, with the shelf portion 44 located at the lower width portion 42 of the middle section 32, and each respective first and second width end wall portion, 28 and 30 respectively; as illustrated in the cited illustrations.

In this manner the differential dimensioning of the present invention between the first vertically disposed upper width portion 40 and the second vertically disposed lower width portion 42, permits, by its design, the necessary smaller width of the upper width 40 for the purpose and use of more accommodatingly and functionally receiving a number of the dimensionally standardized pin members conventionally provided with wiper arms 12 in the prior art, while also permitting receipt and installation within the shroud housing 20 of the standardized conventional wiper blade and frame assemblies 14 by virtue of the larger, wider width dimensions generated vertically by virtue of the second lower width portion 42; the differential width relationship taught by the present invention thereby serving to allow the present invention to be combined in functional operation and use with both conventional wiper arms 12 and conventional wiper blade and frame assemblies 14; while providing shrouded, protected heating and warmth to the wiper blade 14 in improved substantial distinction over the prior art devices seeking to address the problem of heating already available, conventional vehicle windshield wiper equipment; as illustrated by example in FIGS. 2, 8, 9, 10, 11, 12, 13, 15 and other drawings.

In one of several preferred embodiments of the present invention, in this regard, the first vertically disposed upper width portion 40 of the middle section 32 of the shroud housing 20 is provided with dimensions of substantially from about 0.5 inch to about 1.0 inch, or from substantially about 12 mm to about 25.5 mm; and the second vertically disposed lower width portion 42 of the middle section 32 is provided with dimensions of substantially from about 0.5 inch to about 1.25 inch, or from about 12 mm to about 32 mm; while remaining consistent with the novel teaching of the present invention in providing a differential dimensional relationship between the first width portion 40 and the second width portion 42. Additionally, it will be understood that it is within the scope of the present invention to provide the portions 40 and 42 in other differential dimensions to satisfy the present invention's purpose and use in being utilized in combination with various types of conventional windshield wiper assemblies and systems.

In a preferred embodiment, the shroud housing 20 is provided with an inner wiperblade guide channel 46 for guided receipt, installation and securement of the conventional wiper blade and frame assembly 14 within the shroud housing 20.

The shroud 20 is also provided with a first pin-channel 48 across the upper width portion 40 of the middle section 32 for receipt and pinned securement, as discussed in part earlier, of a conventional vehicle wiper arm pin $12^1$ of a wiper arm 12 as illustrated by example in FIGS. 1, 2, 5, 6, 7, 8, 9, 10, 14, 15 and other drawings. The shroud is also further provided with a second pin-channel 50 middle see lower width portion 42 of the middle section 32 for receipt and pinned securement, as also discussed, of a conventional vehicle wiper blade and frame 14, normally standardized under the prior art to be provided or utilized conventionally with a wiper blade connection pin $14^1$, as illustrated by example in the above referenced drawing illustrations.

Figure 2:
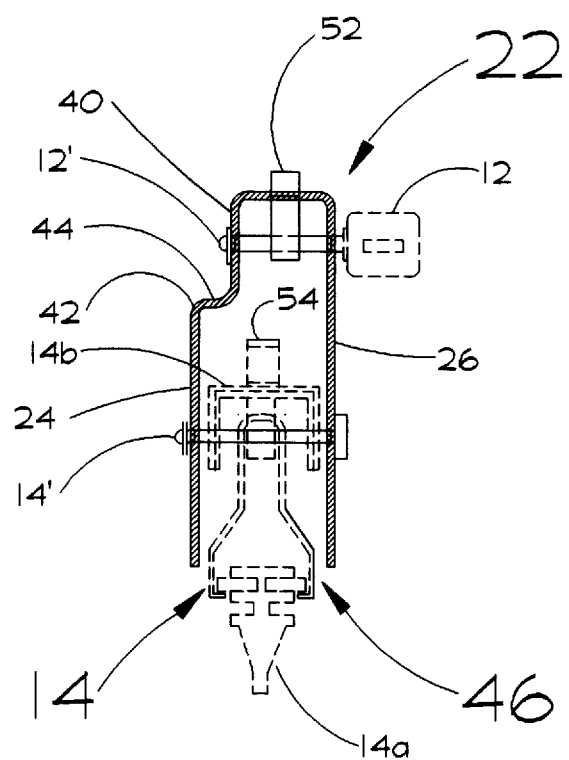
FIG. 2 is an end, cross-sectional view taken along the middle-section of the roof portion of a preferred embodiment of the present invention, illustrating in part the installation and attachment of a conventional vehicle windshield wiper arm, blade and frame assembly.
Figure 3:
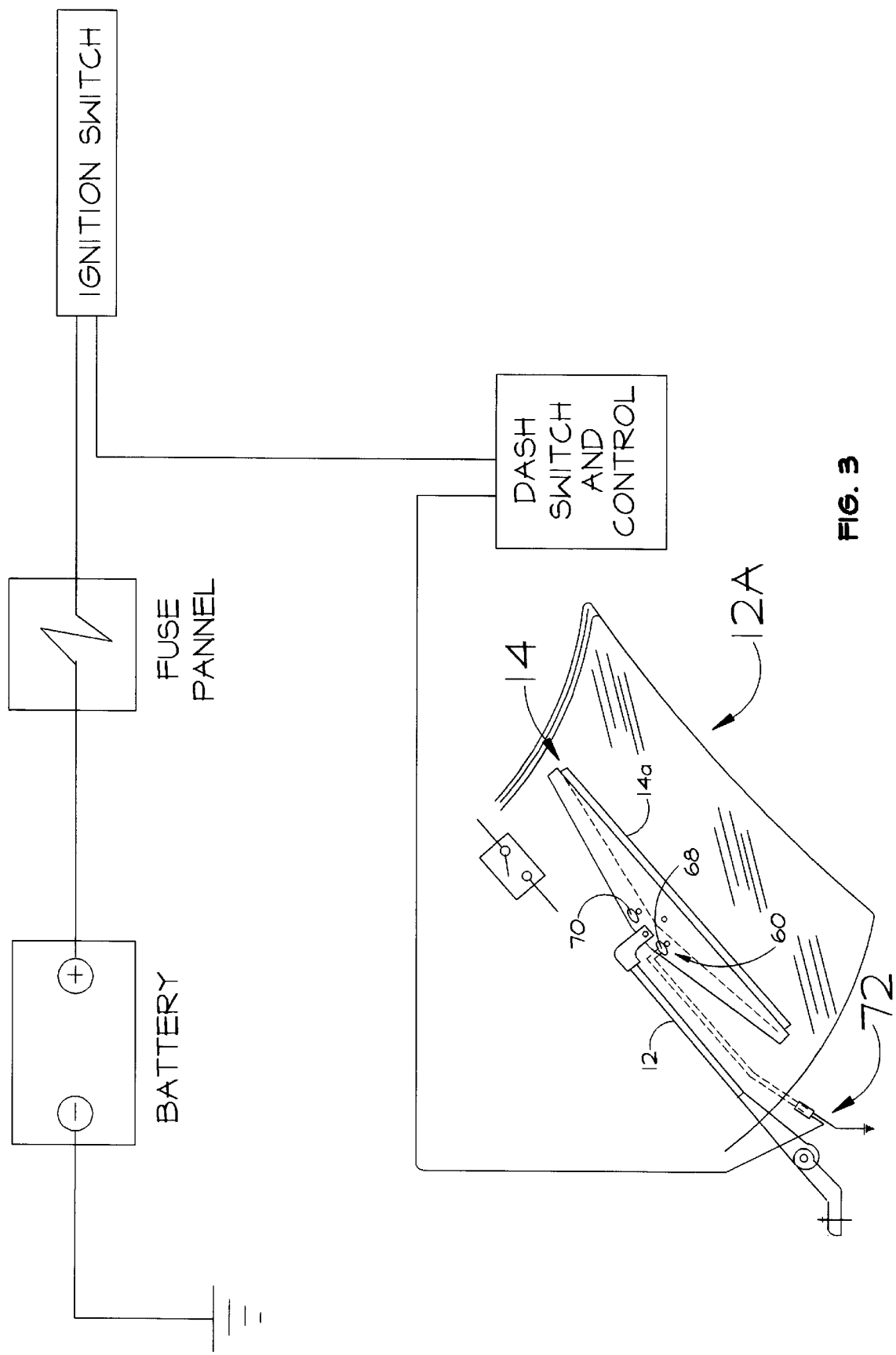
FIG. 3 is in part a block diagram illustrating the electrical interface of a preferred embodiment of the present invention with one of many conventional electrical systems available in a motorized vehicle, and in part the orientation of an electrical element positioning in a preferred embodiment of the invention.
Figure 11:
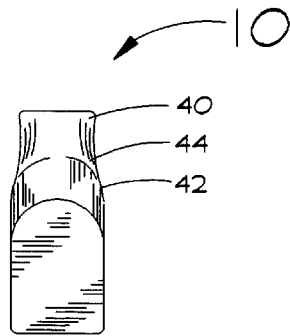
FIG. 11 is an end view of the shroud housing of a preferred embodiment of the invention.
Figure 12:
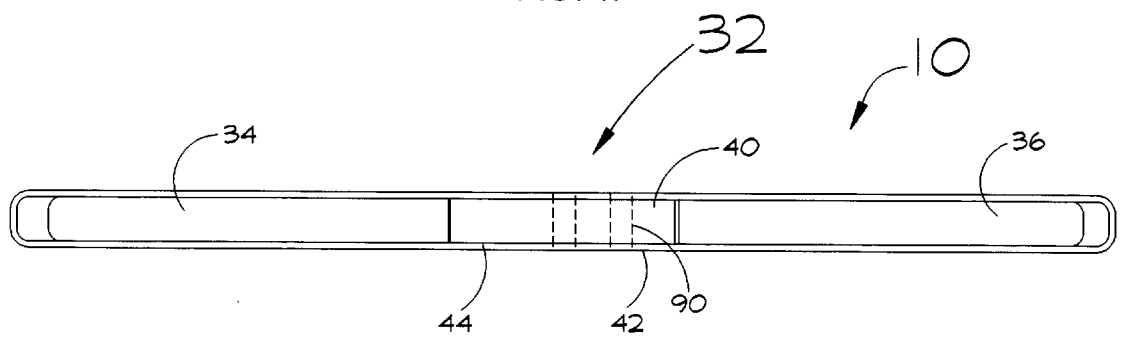
FIG. 12 is a bottom view of the shroud housing of a preferred embodiment of the invention.
Figure 13:
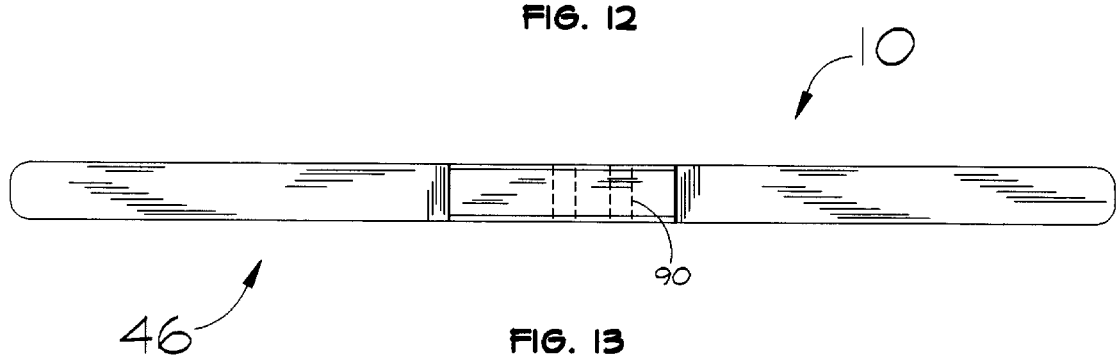
FIG. 13 is a top view of the shroud housing of a preferred embodiment of the invention.
Figure 15:
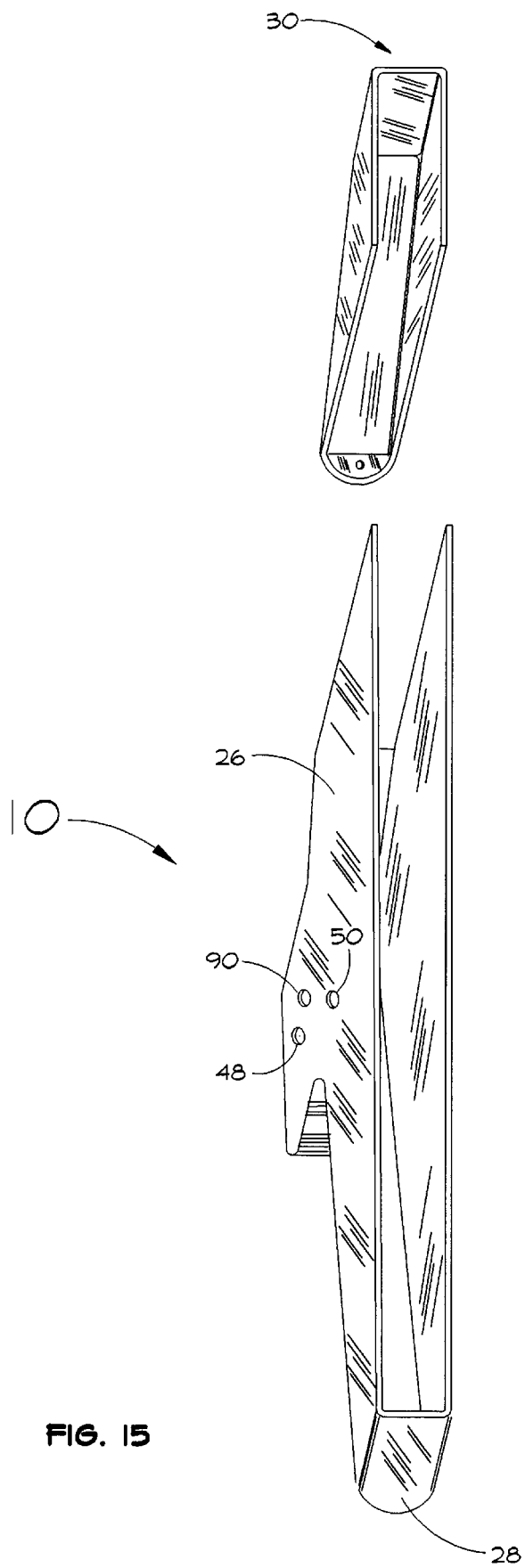
FIG. 15 is a bottom sideend partially exploded perspective view of the shroud housing of a preferred embodiment of the invention, illustrating fitted portions of the present invention.
Figure 16:
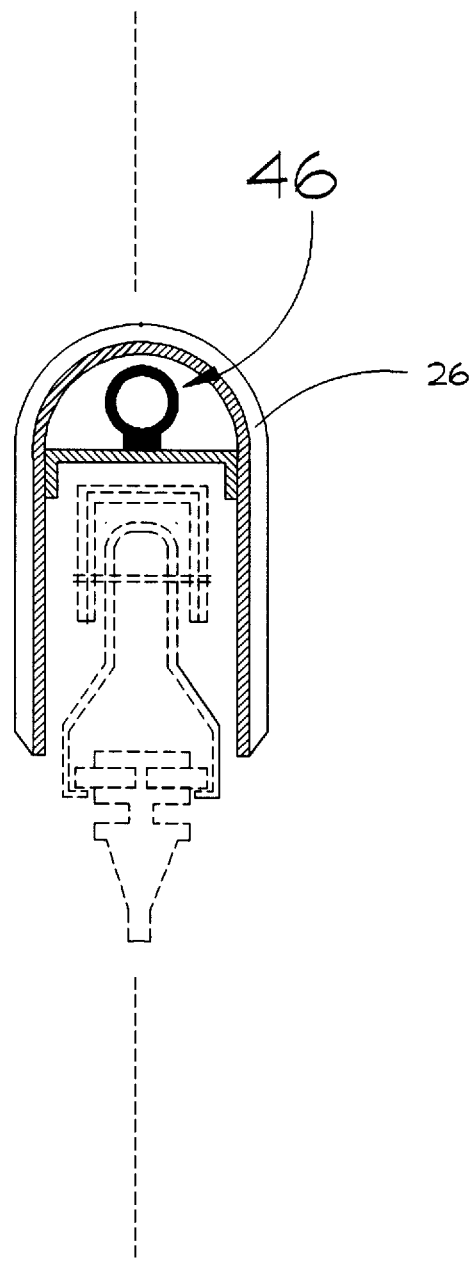
FIG. 16 is a cross-sectional view of an end lateral, longitudinal portion of the improved windshield and windshield wiper heating apparatus.
Figure 17:
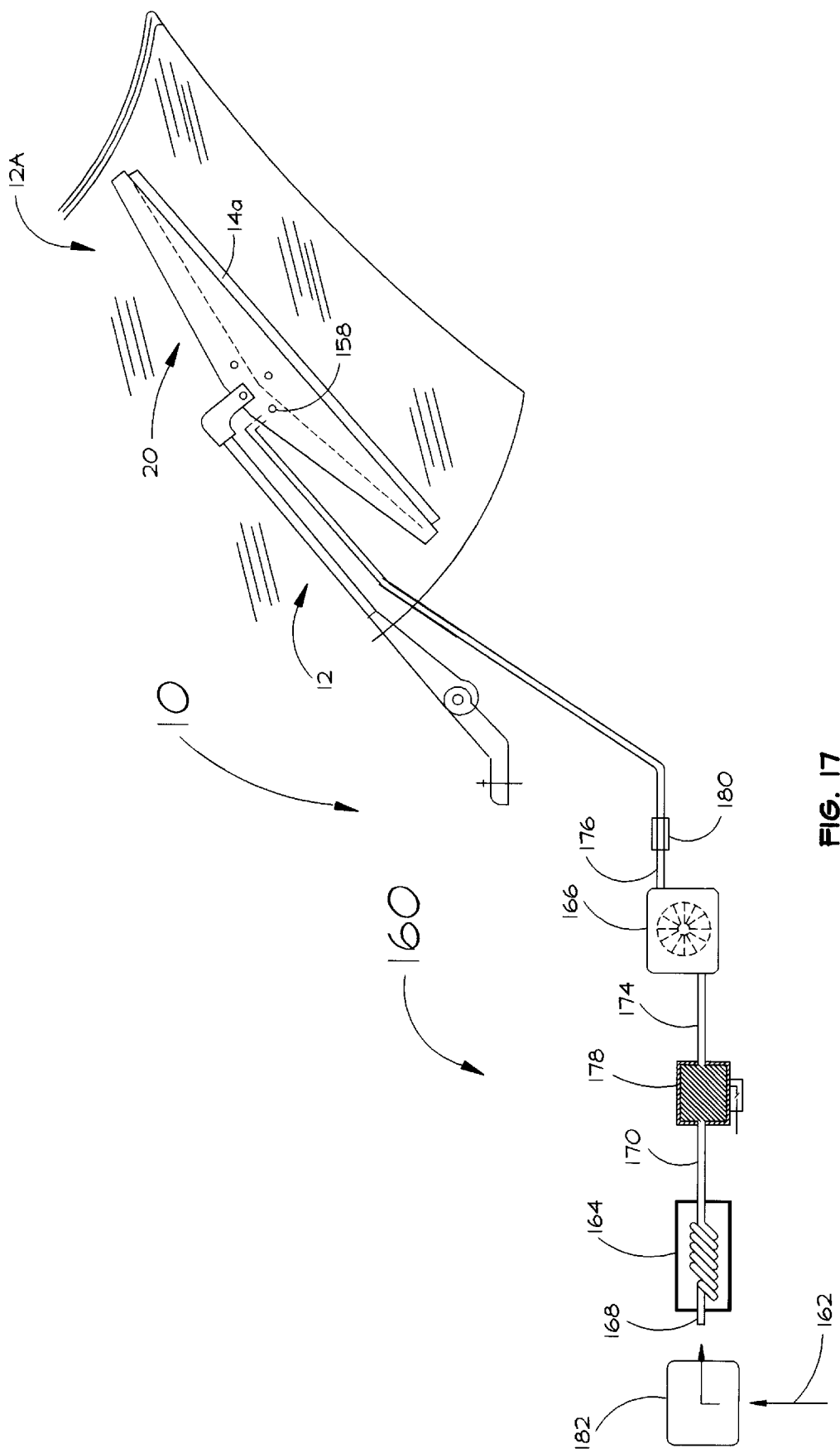
FIG. 17 is a diagrammatic view of the improved windshield and windshield wiper heating apparatus of the present improved invention.
Figure 18:
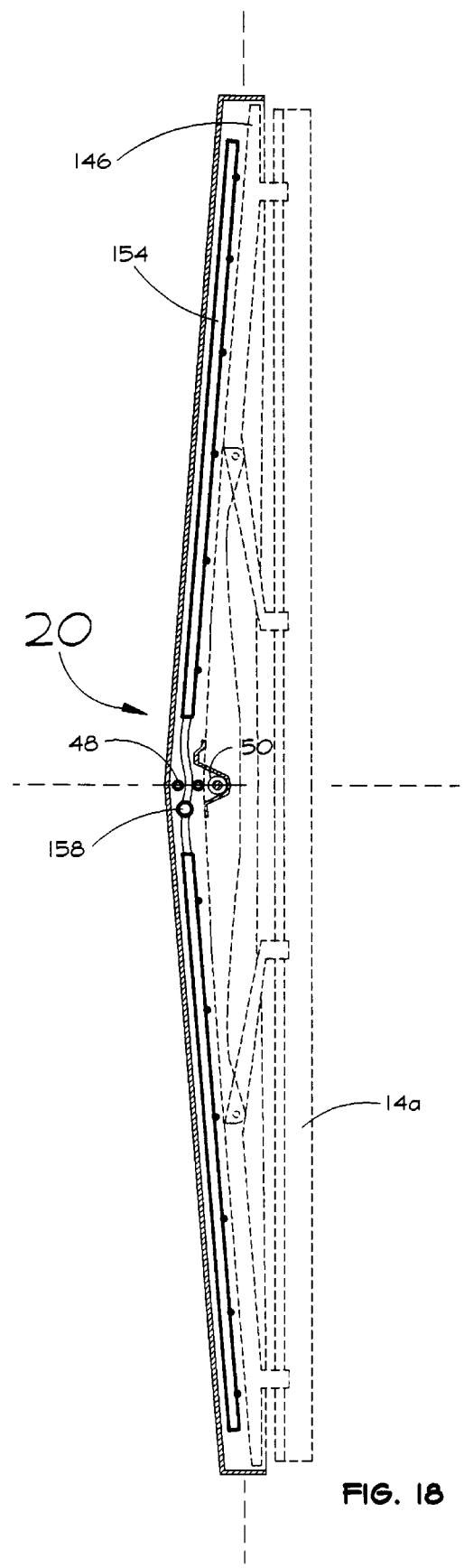
FIG. 18 is a longitudinal cross-sectional view of the improved windshield and windshield wiper heating apparatus of the present improved invention.
Figure 19:
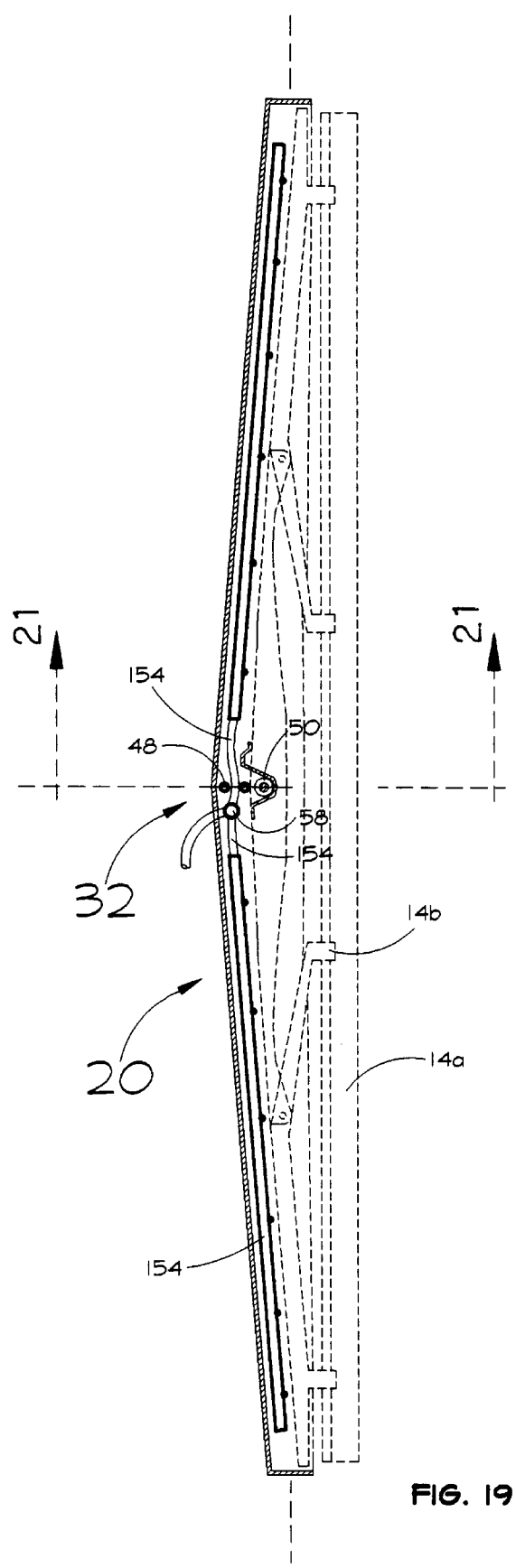
FIG. 19 is another cross-sectional view of FIG. 18, illustrating an additional feature of the perforated duct system and entry port of the present improved invention.

The shroud housing 20 is further provided, in a preferred embodiment, with a first biasable clip 52 which is attached and supported in the shroud housing 20, adjacent to the first channel 48 of the upper width portion 40 of the middle section 32, for supplying secure releasable pressure to assist in securing the wiper arm pin $12^1$, as illustrated in FIGS. 2, 11 and 15. The housing 20 also has a second biasable clip 54 which is attached and supported adjacent to the second channel 50 of the lower width portion 42 of the middle section 32, for supplying secure releasable pressure to assist in securing the wiper blade connection pin $14^1$, as illustrated in FIGS. 2, 7, 8 and 9 by example.

The shroud housing 20, in a preferred embodiment of the invention, is provided in a bowed or somewhat concave longitudinal configuration, as illustrated in FIGS. 7, 8, 9 and 10.

Additionally, in a preferred embodiment, the inner wiper blade guide channel 46 in cross-sectional areas adjacent to the respective end wall portions 28 and 30 of the respective first and second lateral sections, 34 and 36 respectively, have the general configuration of a parabolic cylinder, as illustrated in FIGS. 5, 6, 7, 8, 9, 10, 11 and 15.

Figure 5:
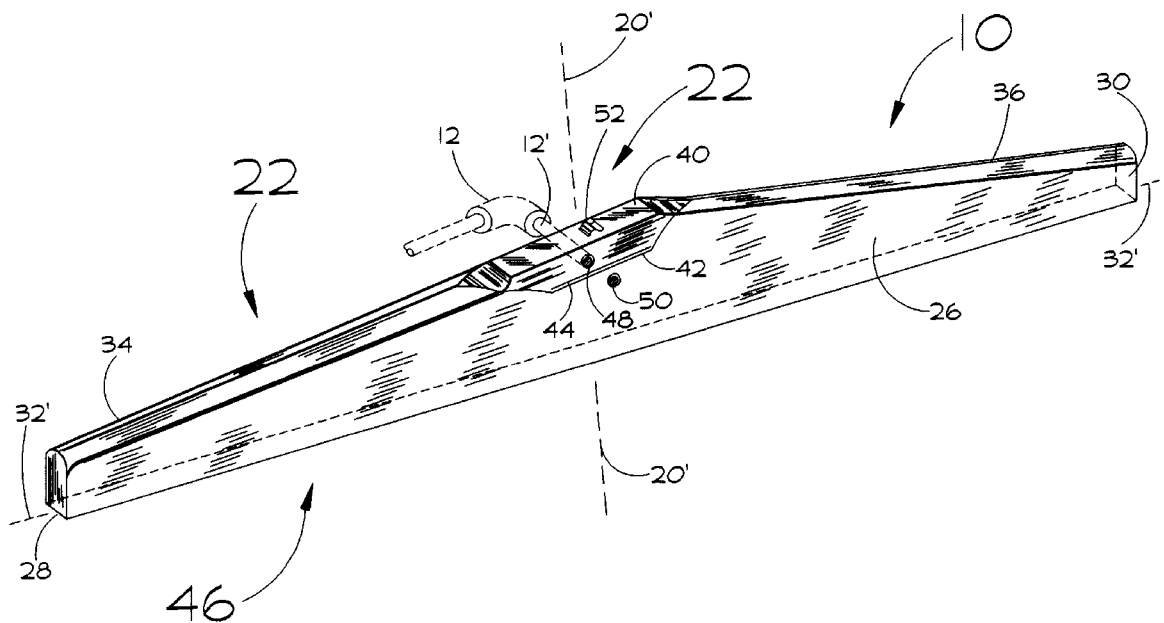
FIG. 5 is an elevated sideend perspective view of a preferred embodiment of the invention, illustrating in part the installation of a conventional vehicle wiper arm.
Figure 6:
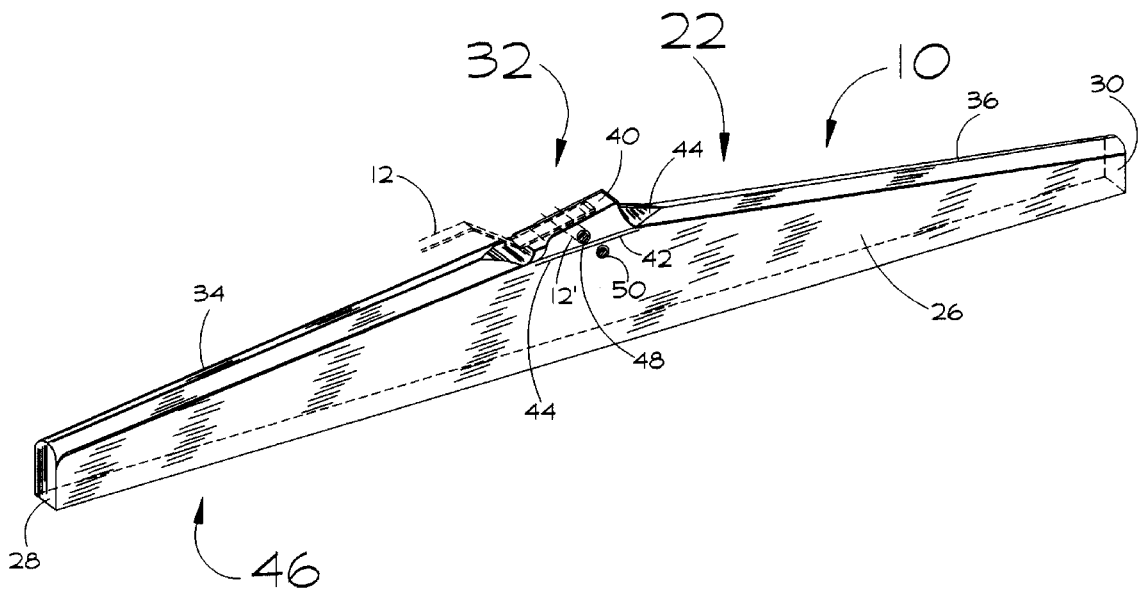
FIG. 6 is an elevated sideend perspective of another preferred embodiment of the invention, illustrating in part the installation of another conventional windshield wiper arm.
Figure 7:
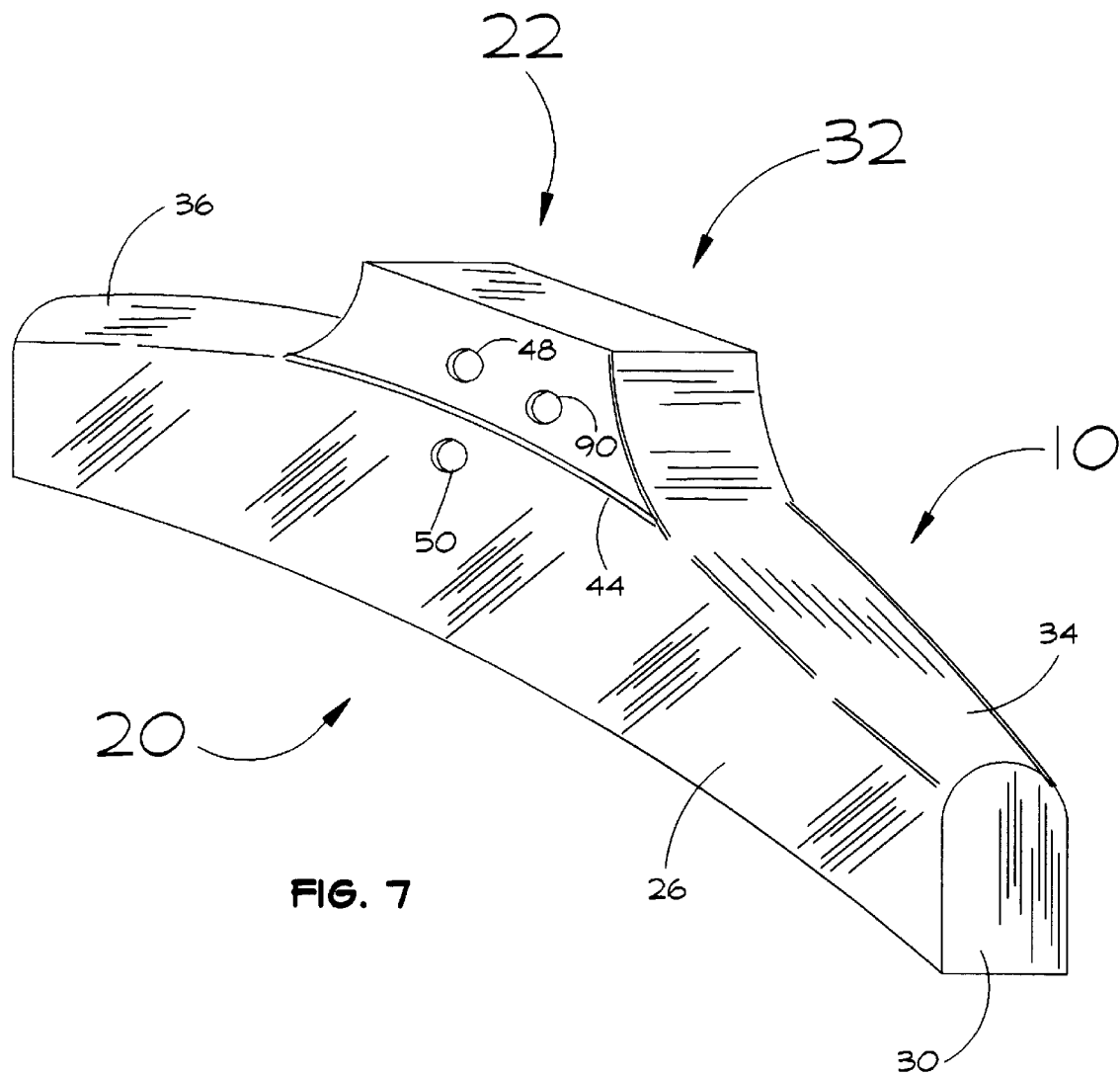
FIG. 7 is an enlarged elevated sideend perspective view of the shroud housing of a preferred embodiment of the present invention.
Figure 9:
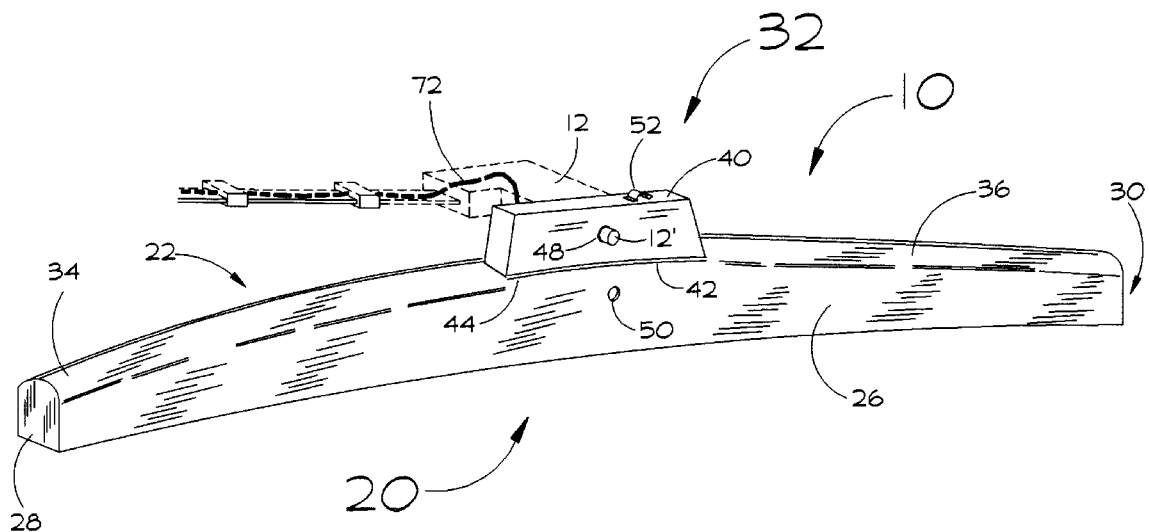
FIG. 9 is an elevated sideend perspective of another preferred embodiment of the invention, illustrating in part the installation of another conventional vehicle windshield wiper arm.
Figure 10:
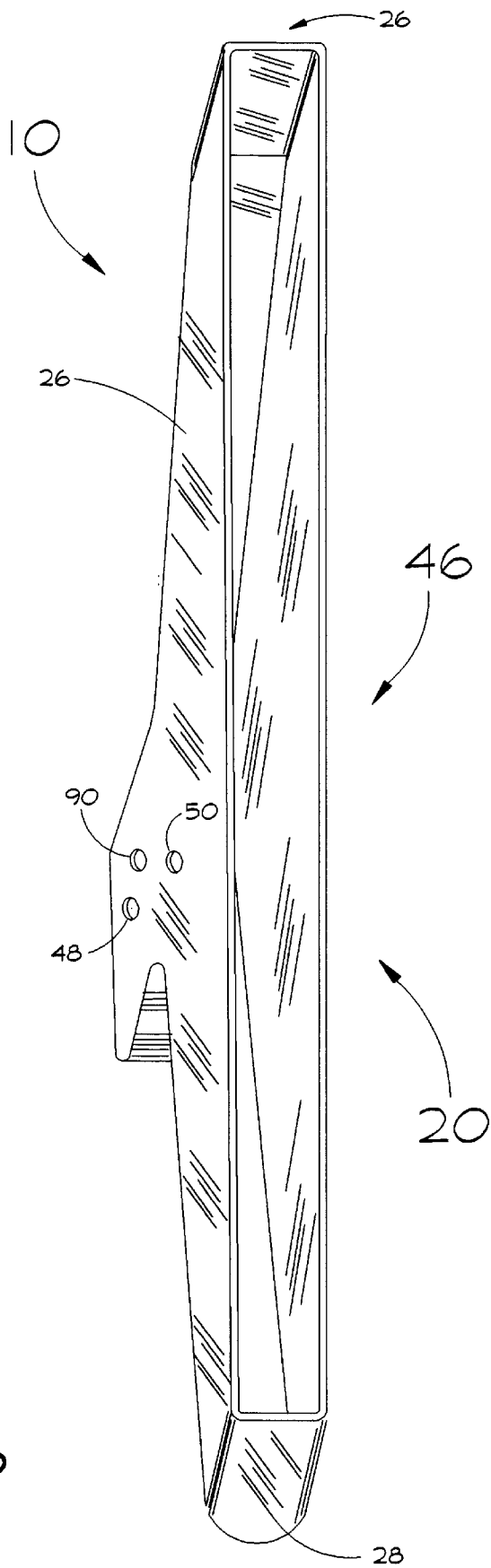
FIG. 10 is a bottom sideend perspective of the shroud housing of a preferred embodiment of the invention.

As indicated earlier, the shroud housing 20 of the present invention 10, is further preferably provided with a first biasable clip member 52 and a second biasable clip member 54, as illustrated in FIGS. 2, 5, 9, and other drawings. In a preferred embodiment, each respective clip, 52 and 54, is provided as an s-shaped, or sinusoidally shaped, spring-clip, each having a first parabola-shaped portion 80 and a second parabola-shaped portion 82, as illustrated in FIG. 2 and other drawings.

The middle section 32 of the shroud 20 is further provided with a clip compressing tool opening 90, as illustrated, by example, in FIGS. 4, 7, 8, 10, 12, 13, 14, 15 and other drawings. The tool opening 90 is positioned in the housing 20 close to, or adjacent to, the second pin-channel 50 for preferred engagement of an offset key member 92, illustrated in partial diagrammatic form in FIG. 4. In this manner, the key member 92 is inserted into the clip compressing tool opening 90 of the shroud 20 and turned to compress with the offset portion 94 of the key 92, the first parabola shaped portion 80 of the second biasable clip 54, to release the biasing pressure of the clip 54, to thereby release wiper blade connection pin 14[1] holding, in attached position, the wiper blade and frame assembly 14 to release the assembly 14 so that it can be removed from the wiper blade guide channel 46 of the internal portion of the shroud 20.

Figure 4:
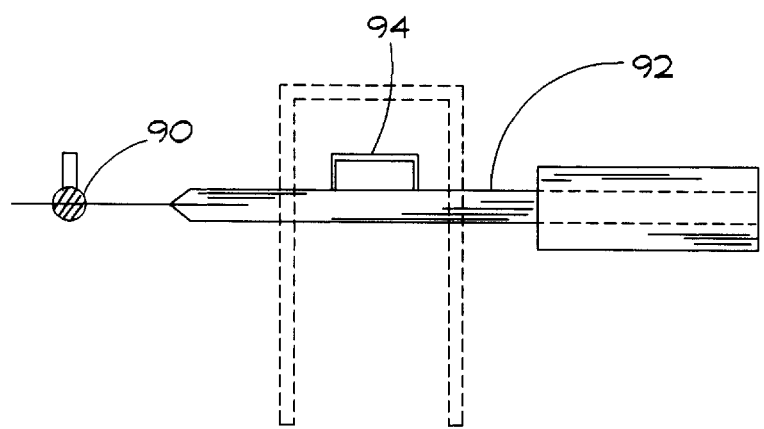
FIG. 4 is an enlarged side and front view, respectively of an offset key member and a clip compressing tool opening, utilized as a part of a preferred embodiment of the invention, presented in a partial diagrammatic form.

The key member 92 can be provided as a small metal screwdriver-type device with a small plastic handle as illustrated in FIG. 4, or in many other configurations and construction materials. Additionally the tool opening 90, as well as the pin channels 48 and 50 of the shroud 20, when not in use or otherwise engaged, can be provided with removable plugs (not shown in drawings).

Figure 8:
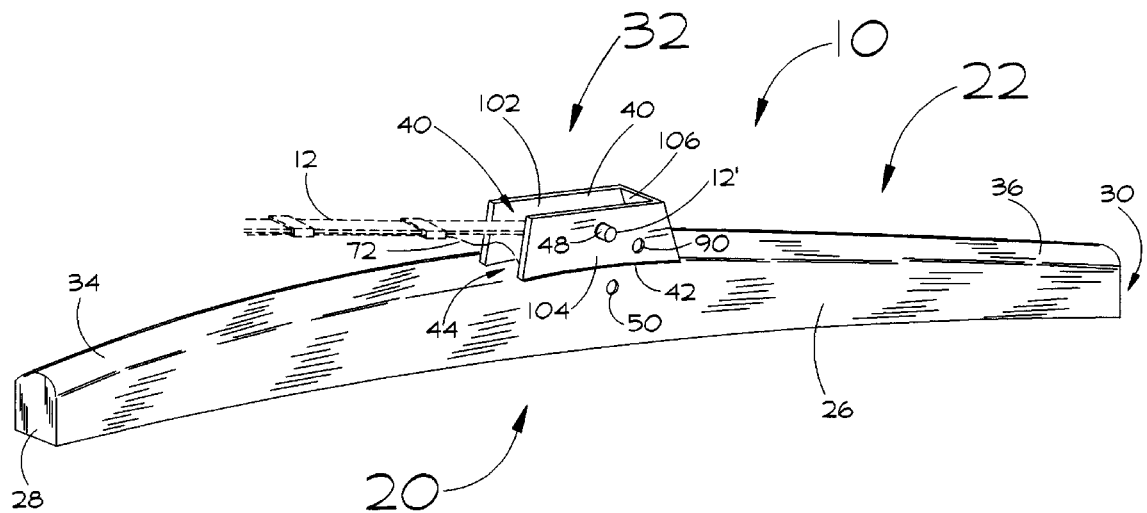
FIG. 8 is an elevated sideend perspective of another preferred embodiment of the invention, illustrating in part the installation of another conventional vehicle windshield wiper arm.
Figure 14:
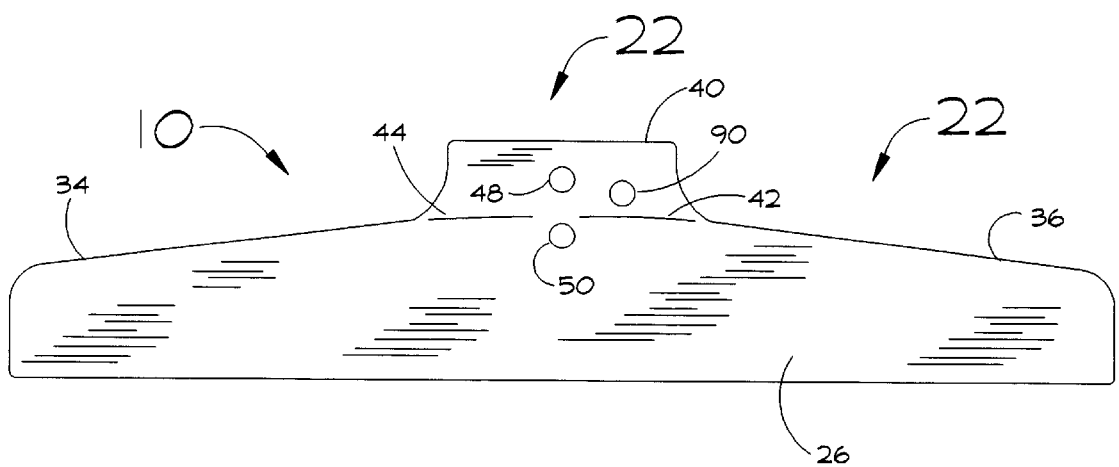
FIG. 14 is a side view of the shroud housing of a preferred embodiment of the invention.
Figure 20:
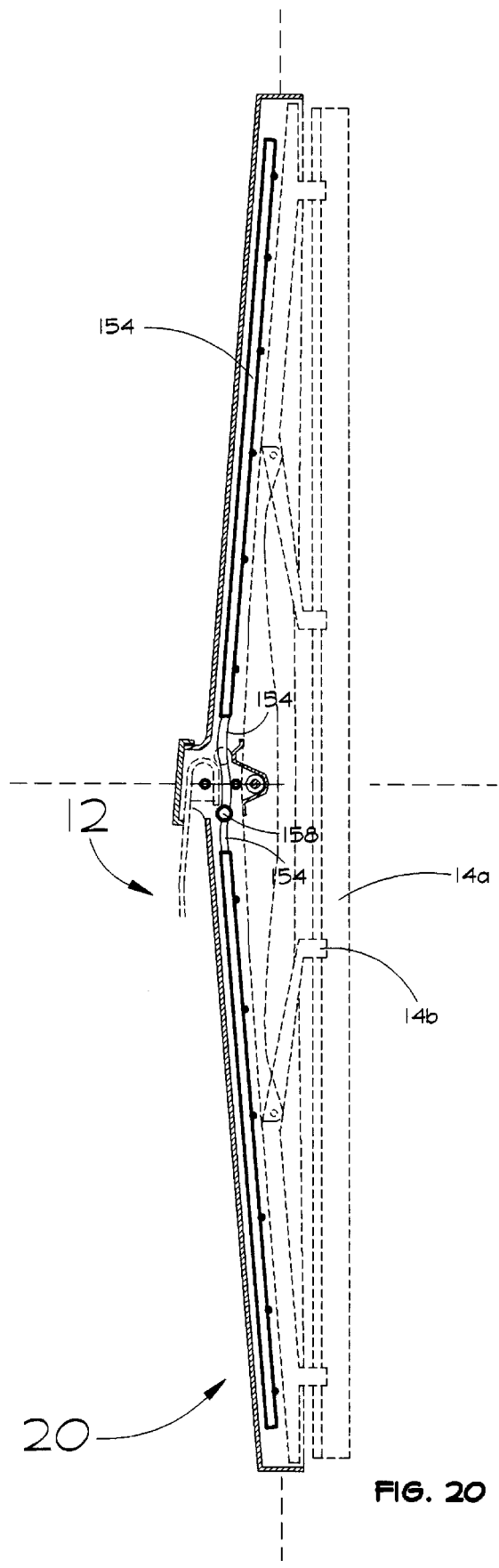
FIG. 20 is a longitudinal cross-sectional view of another preferred embodiment of the present improved windshield and windshield wiper heating apparatus.
Figure 21:
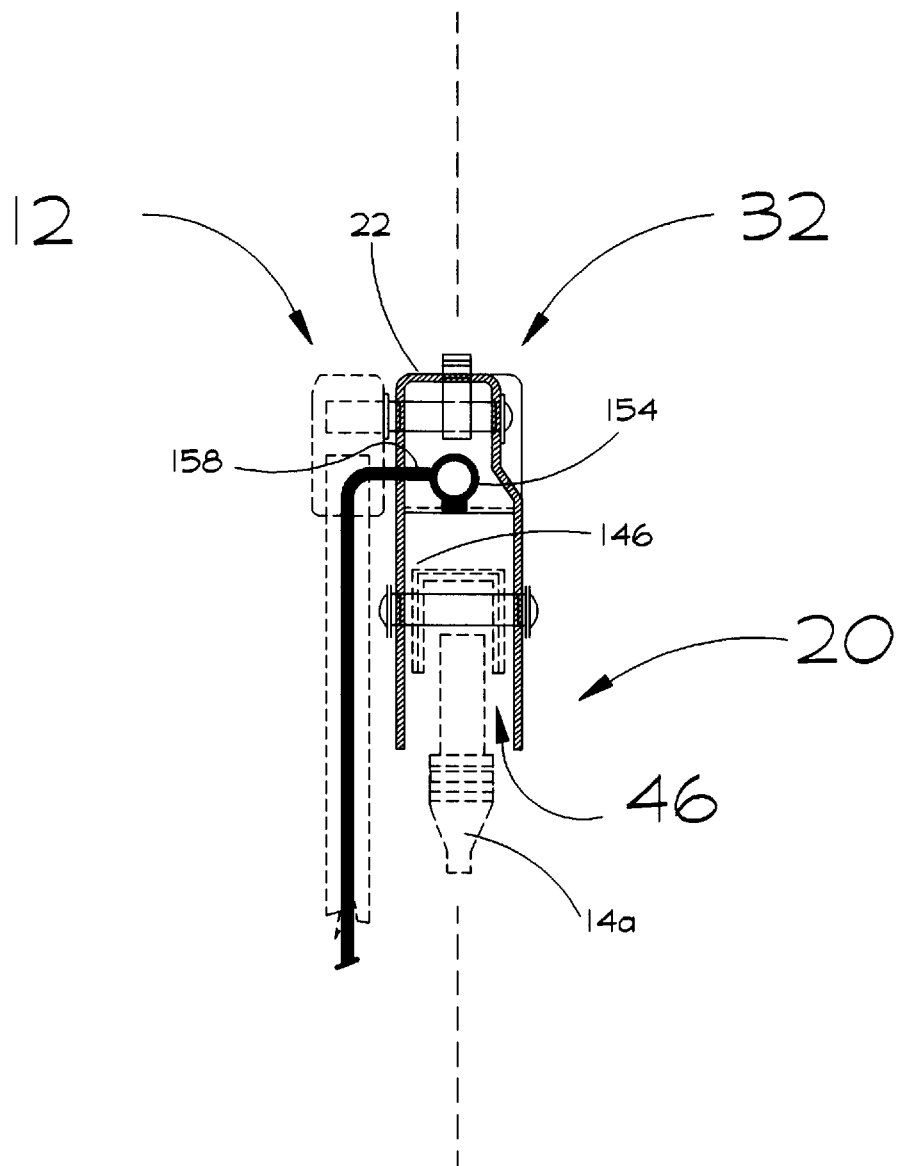
FIG. 21 is a cross-sectional view taken along line 21—21 of FIG. 19, of the present improved invention.
Figure 22:
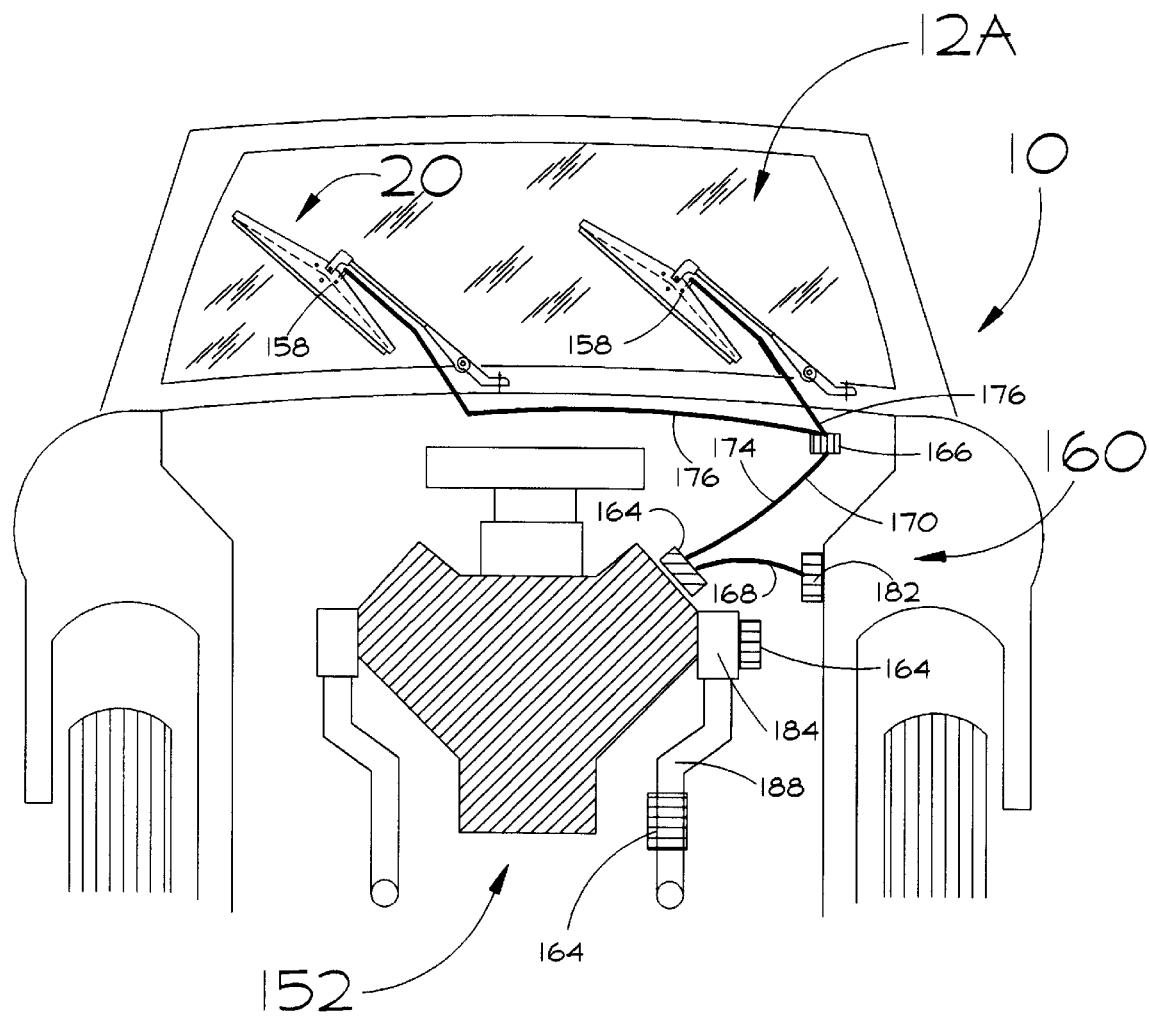
FIG. 22 is a diagrammatic-system view of the present improved windshield and windshield wiper heating apparatus assembly.
Figure 23:
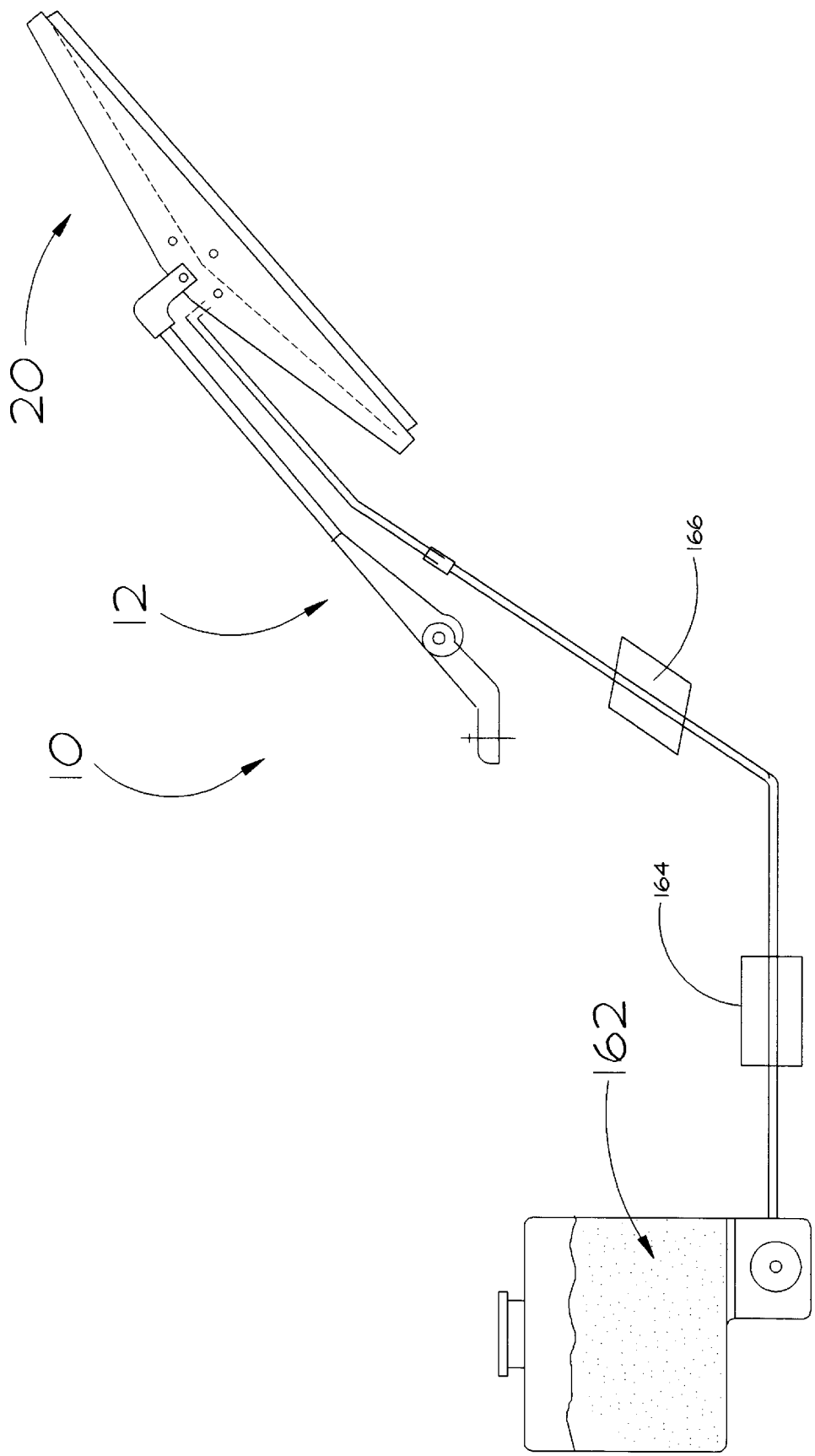
FIG. 23 is a diagrammatic view of another preferred embodiment of the present improved invention illustrating the supply of an ambient liquied fluid.
Figure 24:
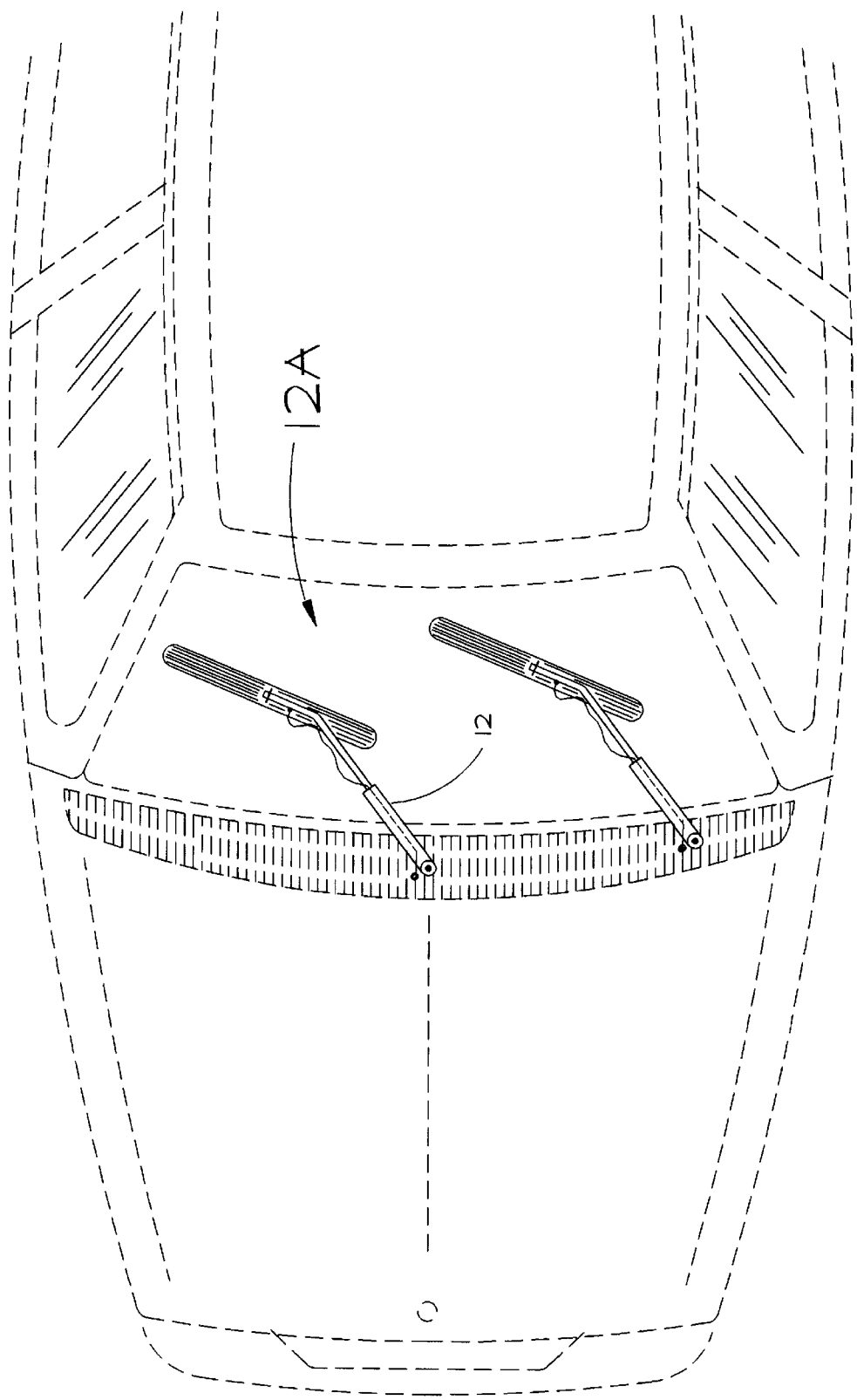
FIG. 24 is an illustrative diagrammatic drawing illustrating the installed present improved windshield and windshield wiper heating apparatus in an installed configuration on a conventional automobile vehicle.
Figure 25:
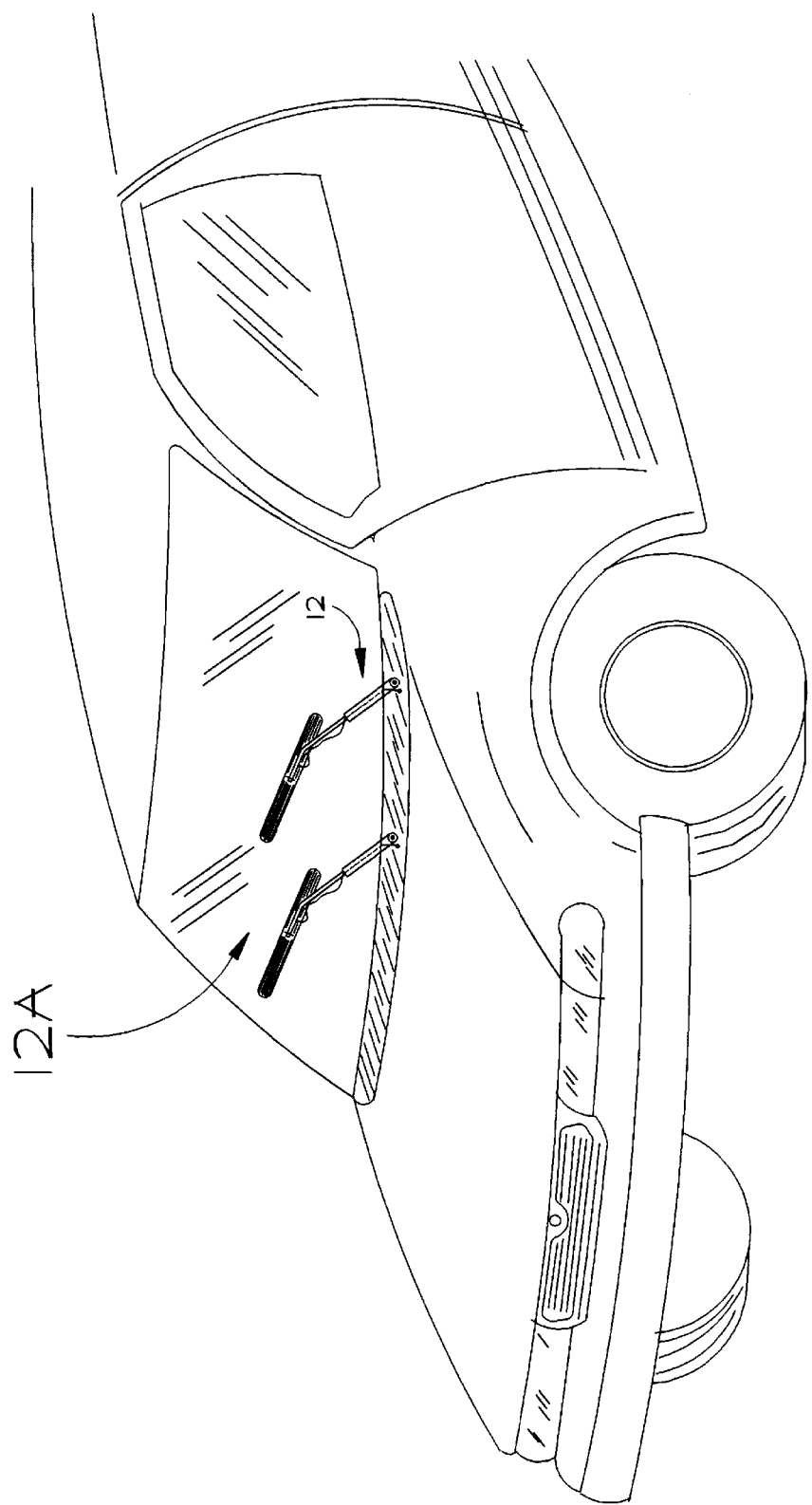
FIG. 25 is another diagrammatic perspective view illustrating the present improved invention installed on a conventional automobile vehicle.
Figure 26:
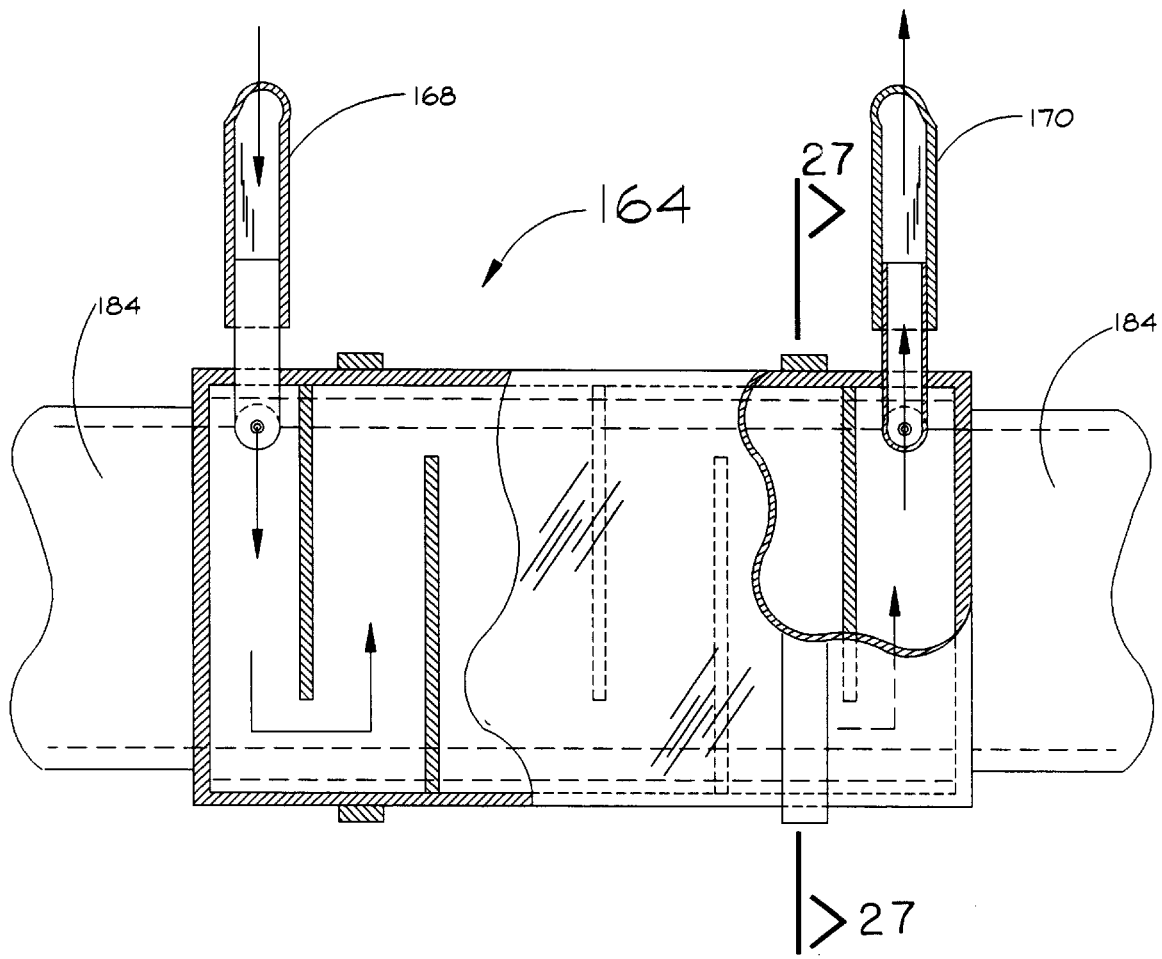
FIG. 26 is a cross-sectional view of one conventional prior art heat-exchanger means for illustrative example.
Figure 27:
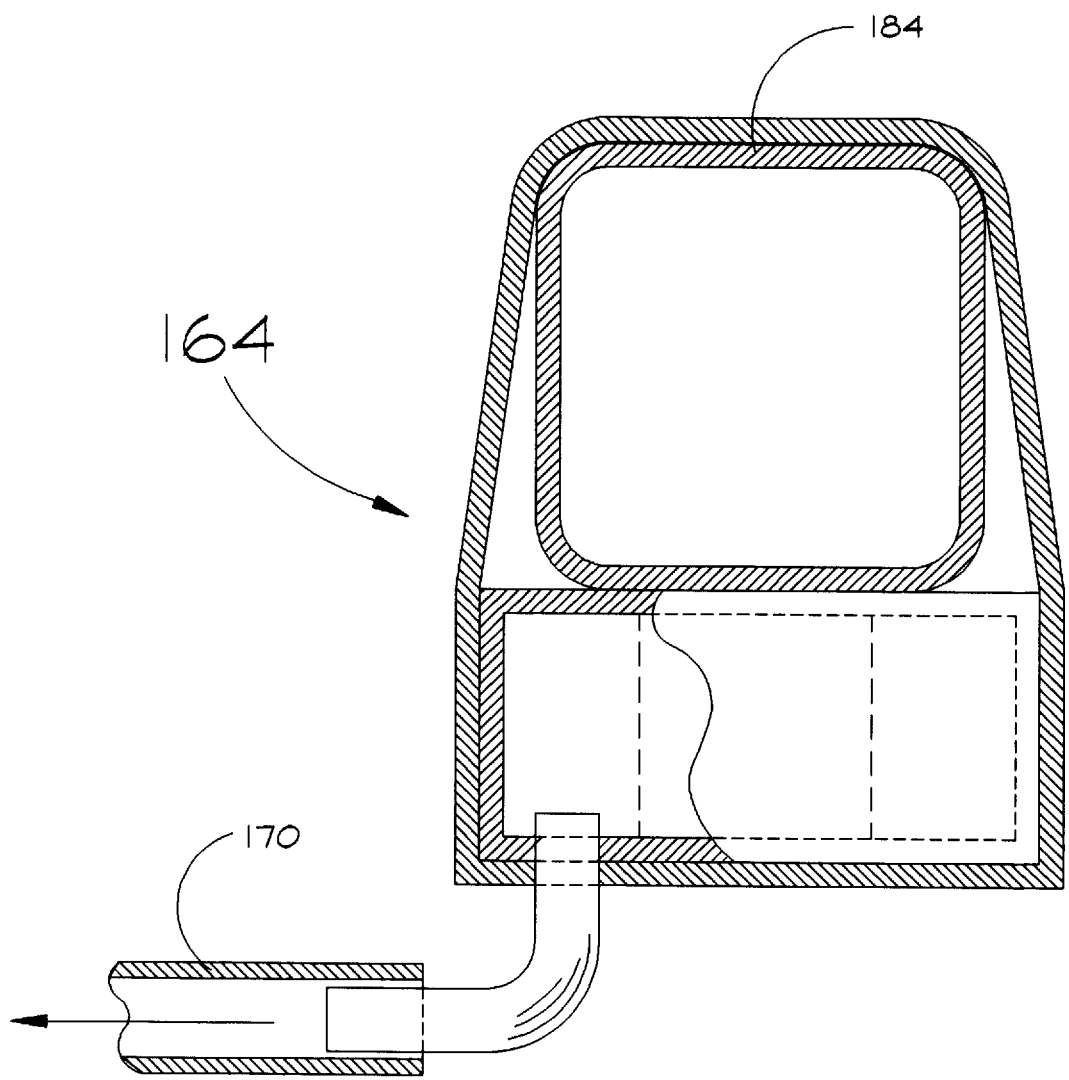
FIG. 27 is a cross-sectional view taken along line. 27—27 of FIG. 26.
Figure 28:
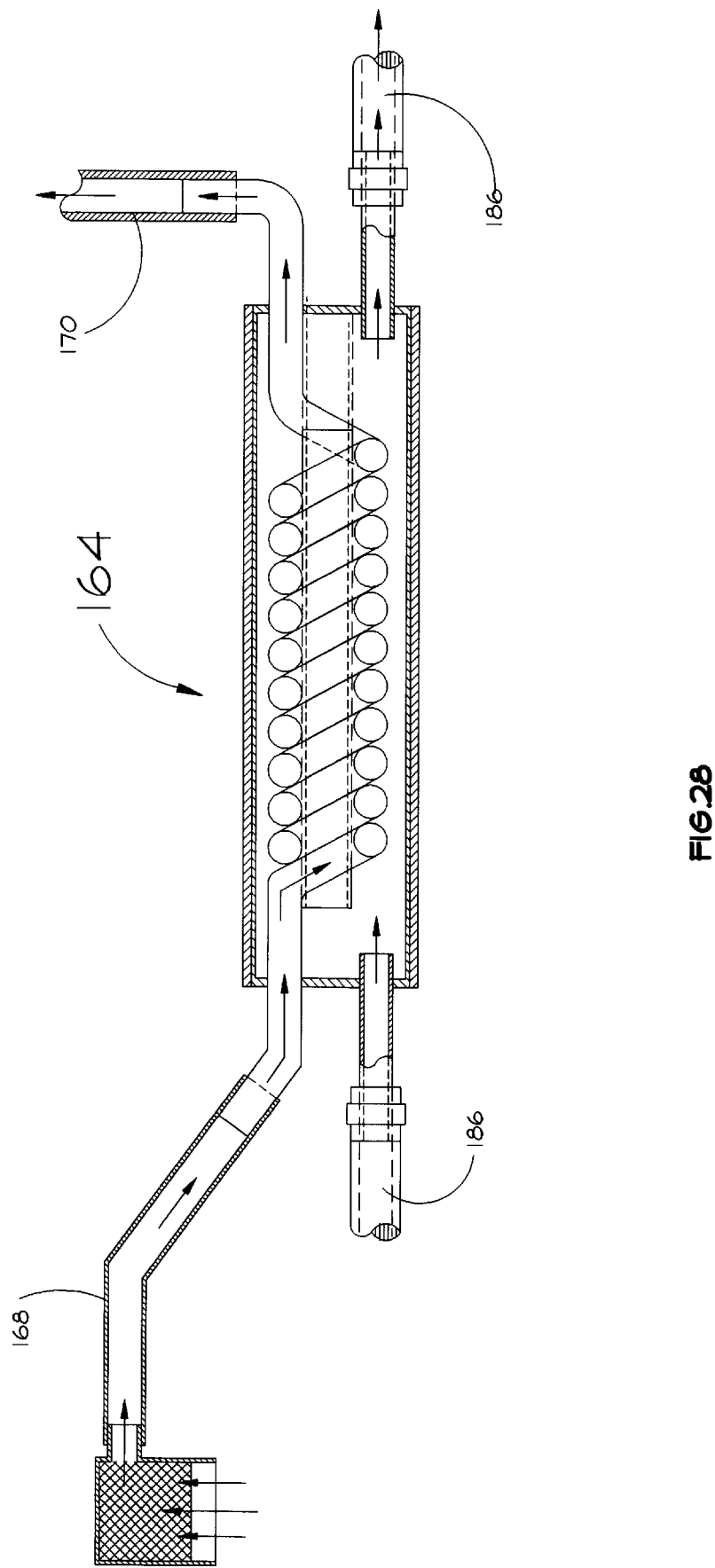
FIG. 28 is a cross-sectional view of another conventional prior art heat-exchanger means for illustrative example, including diagrammatic illustration of a filtering system.
Figure 29:
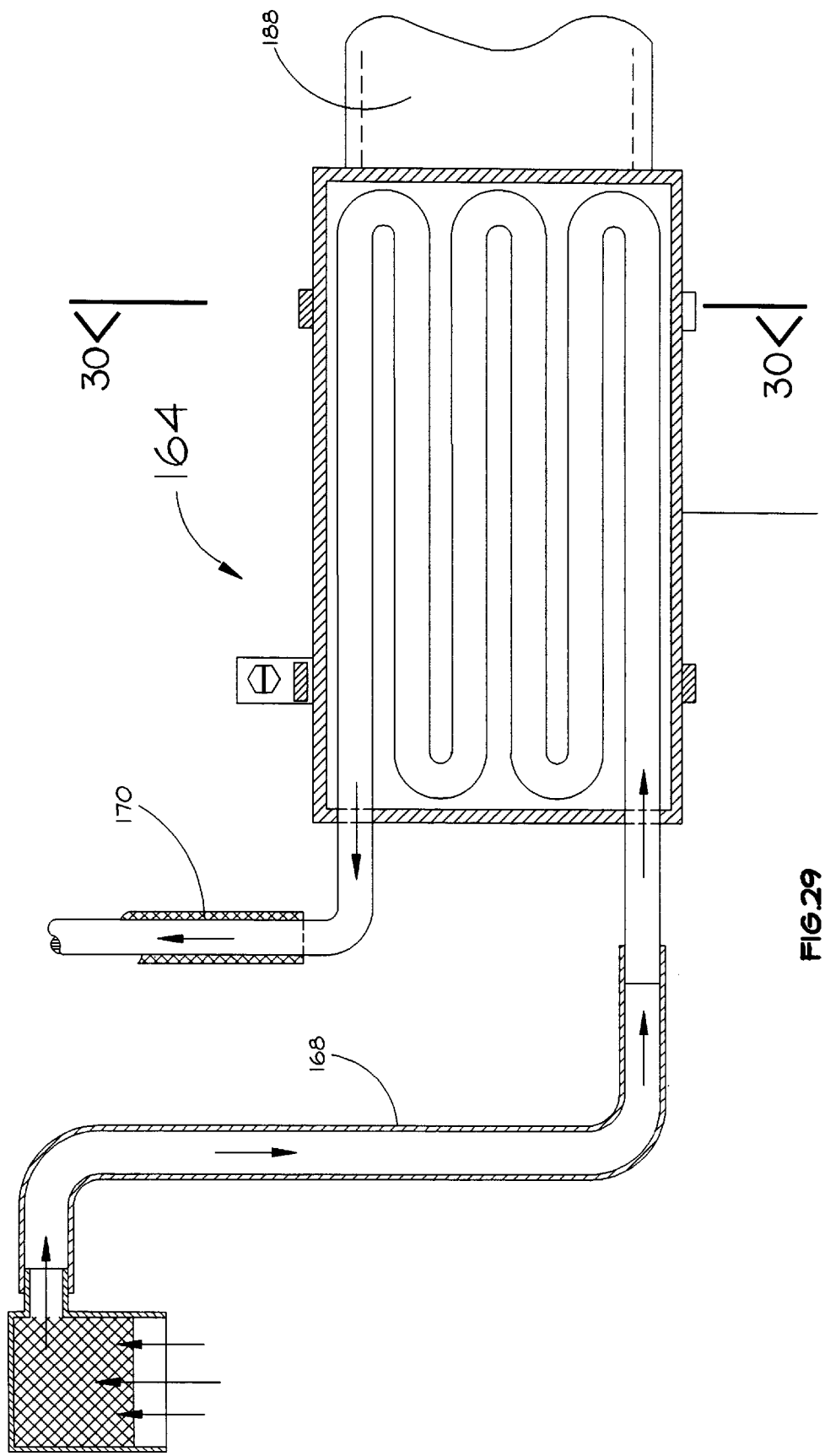
FIG. 29 is a cross-sectional view of another conventional prior art heat-exchanger means for illustrative example, also illustrating a filtering means and mounting on an exhaust pipe line of a vehicle engine.
Figure 30:
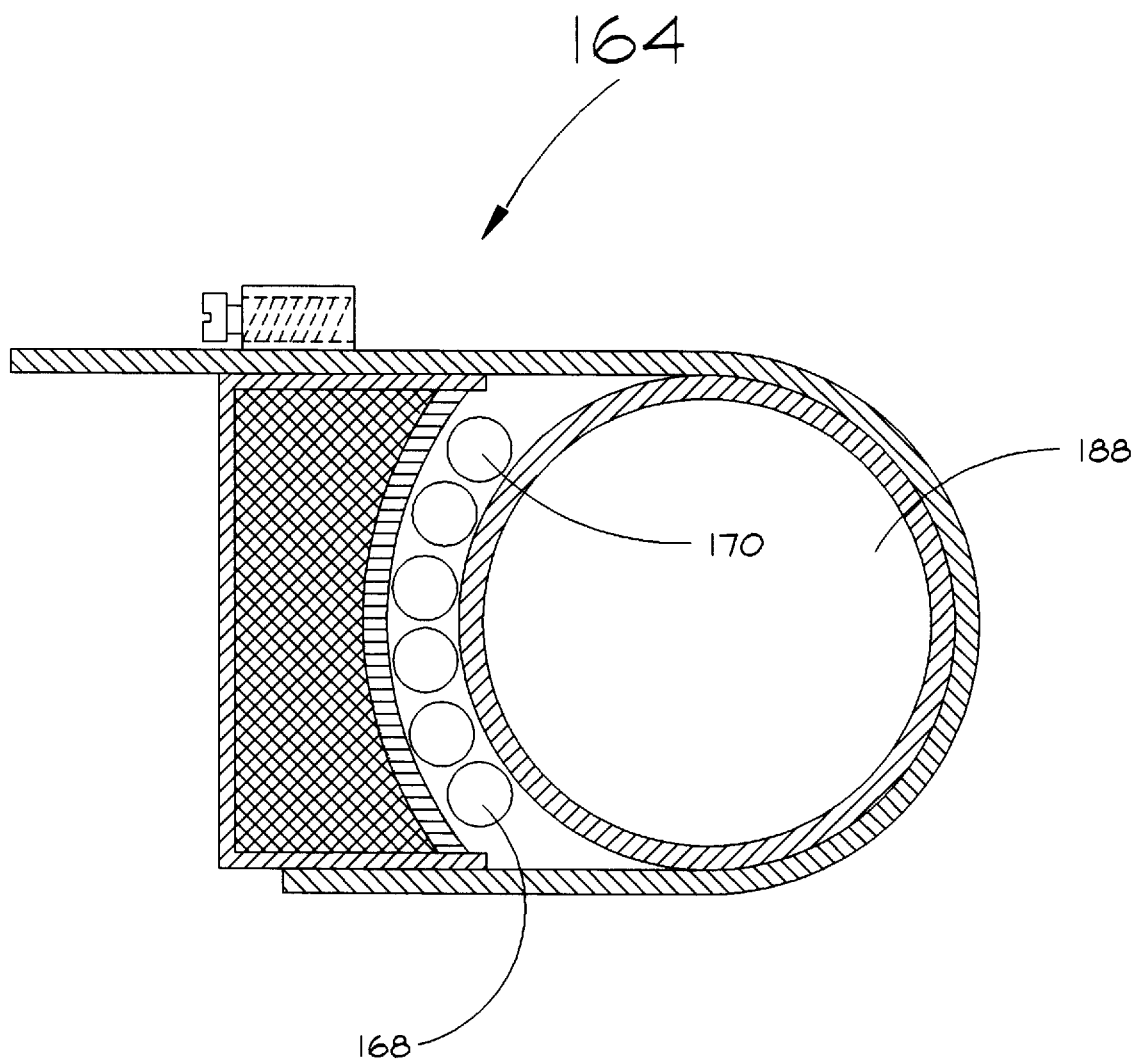
FIG. 30 is a cross-sectional view taken along line 30—30 of FIG. 29.

In another preferred embodiment of the invention the first vertically disposed upper width 40 and shelf portion 44 is structured and defined in accordance with the teaching of the present invention within the walls of a rectangular wall member 100, as illustrated in part in FIG. 20, and more fully illustrated in FIG. 14. In one preferred embodiment the wall member 100 is provided with first and second walls, 102 and 104, generally parallel to one another, and a third end wall 106, as illustrated in FIG. 8.

In an additional preferred embodiment of the invention the upper width 40 of the middle section 32 is provided with a curved attachment member 120, for receipt and installation in certain cases in the conventional prior art when the end portion attachment area of the wiper arm 12 is provided, with the vehicle, having a curved attachment end-piece 122, as illustrated in FIG. 20. Additionally, in a related preferred embodiment, the wall member 100 is provided with a snap-on, or spring-loaded snap-on cover member 124, for seating and support on top or above the rectangular wall member 100, as illustrated in FIG. 20, to assist in keeping air from entering the shroud 20 in this embodiment. In the embodiment illustrated in FIG. 20, a spring biased member 126 is illustrated in this example as being utilized with the cover member 124. It will be understood that a number types of biased or snap-on covers can be employed at this position of this embodiment of the shroud 20 to prevent air from entering.

Additionally, the prior art envelope or cover members have been constructed of flexible, elastic and/or rubber-like materials such as the material utilized to construct conventional wiper blades. However, the present invention utilizes construction materials in manufacturing or fabricating the shroud housing 20 of the present shroud system 10 which are preferably solid and resilient in character such as metal, aluminum, other metal alloy, harder temperature resistant polymer or composite materials, or substantially harder, though malleable, polymer; and/or plastic, wood, glass composite or metal materials; so that the shroud housing 20 is substantially solid, resilient and not appreciably elastic, in character. Additionally, it will be understood that the shroud housing 20 can be constructed in attachable parts or in one-piece integral construction, as illustrated in part by example in FIGS. 7, 10 and 15. In so doing the external and/or internal surfaces of parts, sections and portions of the housing 20 can be coated with one or more layers of insulating material, to protect against heat loss. When utilized in this manner, in a preferred embodiment, on external surfaces of the shroud housing 20, the color of the external insulation material can be used to add color and design characteristics to the appearance of the shroud 20.

While the present invention has been described in connection with the particular embodiments thereof, it will be understood that many changes and modifications of this invention may be made by those skilled in the art without departing from the true spirit, concepts and scope of the present invention. Accordingly, the appended claims are intended to cover all such changes and modifications as falling within the true scope and spirit of the present invention. The reader is requested to determine the scope of the invention by the appended claims and their legal equivalents, and not by the examples which have been given.

Having described my invention, I claim:

1. An improved windshield and windshield wiper heating apparatus assembly for use in installable combination with a windshield wiper arm assembly, a flexible and pivotable wiper blade and frame assembly, a vehicle windshield having outside and inside surfaces and a vehicle engine; the windshield wiper arm assembly being electrically activated and pivoted in relation to the outside surface of the windshield, and having at one end thereof a wiperarm pin member which moves in adjacent relation with the outside surface when the wiper arm is activated and pivoted; and the wiper blade and frame assembly having at least a length component and a transverse width component, the transverse width component of the wiper blade and frame assembly defining a pin connection channel; the length component of the wiper blade and frame assembly having a middle portion and first and second lateral portions on either side thereof; said improved windshield and windshield wiper heating apparatus assembly comprising:

a open-ended shroud housing subassembly having a longitudinally oriented roof portion, a pair of opposing longitudinally positioned wall portions and a pair of opposing transversely positioned endwall portions, defining an arcuate open end opposite of said roof portions, said roof portion having a middle section and adjoining first and second lateral sections, extending longitudinally on either side thereof, said middle section having and defining a first transversely and vertically disposed upper width and a second, differentially dimensioned, transversely and vertically disposed lower width such that a shelf portion is defined transversely of a vertical axis of the lower width, the first and second lateral sections being concurrent and coextensive with, and between, the upper width of the middle section and each of the respective end wall portions, said shroud housing subassembly defining a first inner pin-channel extending substantially transversely of a common vertical axis of the upper width of said middle section and the open end, for receipt and installation of the wiperarm pin member, said wiperarm pin member being inserted through and rotatably and pivotably attached to the upper width of the middle section of said shroud housing subassembly, such that the shroud housing can pivot in response to motion when the windshield wiper arm is movably activated, and can respond positionally to weight bearing stress generated by the outside surface of the windshield and an installed windshield wiper blade and frame assembly in contact with the windshield, said shroud housing subassembly further having and defining a second inner pin-channel, extending substantially transversely of a vertical axis of the lower width, and substantially parallel with the first inner pin-channel, for alignment, during installation of the wiper blade and frame assembly, with the pin connection channel of the transverse width component of the wiper blade and frame assembly, the shroud housing subassembly further comprising a wiper frame and blade connection pin, said pin being slideably and releasably installed, when the wiper blade and frame assembly is in installable position, such that said pin registers and communicates with the second inner pin-channel of said shroud housing subassembly and the pin connection channel of the wiper blade and frame assembly, so that the wiper blade and frame assembly is movably and pivotably attached and installed within the open-ended shroud housing subassembly and pivotably responsive, rotationally, in weight-bearing relationship, about a axis of the frame and blade connection pin so registered, to a contour and configuration of the outside surface of the vehicle windshield, said shroud housing subassembly having and defining an inner installation channel operatively coextensive through the first upper width, the second lower width, the lateral sections, wall portions, endwall portions and open end, and through which the first and second inner pin-channels pass, and by, and within, which the wiper blade and wiper frame assembly is movably and releasably channeled and flexibly and pivotally connected; and a perforated duct means for providing heated fluid, mountably, positioned within the inner installation channel, generally, transversely of and vertically between the first inner pin-channel and the second inner pin-channel of the middle section, and extending, on either side thereof, substantially along each of the first and second lateral sections such that it is positioned above and adjacent to the first and second lateral portions of the wiper blade and frame assembly for fluid heating thereof within the inner installation channel, one of the pair of opposing longitudinally positioned wall portions of said open-ended shroud housing subassembly defining a heated fluid entry port, positioned adjacent to and proximally, vertically between the first and second inner pin-channels of the middle section, in channelable communication with said perforated duct means, for the communication and passage of a heated ambient fluid therethrough; and heating and pump assembly means for heating an ambient fluid with convection currents from the vehicle engine and directing the ambient fluid to the heated fluid entry port of the open-ended shroud housing subassembly, said heating and pump means comprising:

heat exchanger subassembly means mounted generally adjacent to a heat energy and convection current generating portion of the vehicle engine, for collecting and utilizing heating convection currents therefrom to heat the ambient fluid, said heat exchanger subassembly means having an inboard communication line for directing the ambient fluid into the heat exchanger subassembly means and an outboard communication line for directing the ambient fluid, after heating, out of the heat exchanger subassembly, pump subassembly means for pulling the ambient fluid, after heating, from the heat exchanger, and directing the ambient fluid to the heated fluid entry port of the open-ended shroud housing subassembly, said pump subassembly means having a first communications line channelably connected to the outboard communication line of the heat exchanger subassembly means for directing the ambient fluid, after heating, from the heat exchanger subassembly means to the pump subassembly means, and a second communications line for directing the ambient fluid from the pump subassembly means to the heated fluid entry port of the open-ended shroud housing subassembly.

2. The improved windshield and windshield wiper heating apparatus assembly of claim 1,
wherein:
said first upper width of the middle section of the roof portion of said open-ended shroud housing subassembly is dimensioned from about 0.5 inches to about 1.0 inches, or from about 12.7 mm. to about 25.4 mm., and said second lower width of the middle section of the roof portion of said open-ended shroud housing subassembly is dimensioned from about 0.5 inches to about 1.25 inches, or about 12.7 mm. to about 31.75 mm.; said second lower width being differentially dimensioned from, and greater than, said first upper width.

3. The improved windshield and windshield wiper heating apparatus assembly of claim 1,
wherein:
said open-ended shroud housing subassembly is vertically bowed in configuration along the opposing longitudinally positioned wall portions and the pair of opposing transversely positioned endwall portions of the open-ended shroud housing subassembly of said improved windshield and windshield wiper heating apparatus assembly.

4. The improved windshield and windshield wiper heating apparatus assembly, of claim 1,
wherein:
the middle section further comprises:
a generally rectangular wall structure having first and second parallel walls, each of which is generally trapezoidal in configuration when viewed along a vertical axis of the middle section, and a third endwall, the parallel walls and endwall, each having first and second widthside portions and inside and outside surfaces, each of the first width side portions of each wall being fixedly attached to the adjoining first and second lateral sections of said roof portion, and each of the second widthside portions being a free end, such that the inside surfaces of the parallel walls define the first transversely and vertically disposed upper width and the shelf portion defined transversely of a vertical axis of the lower width, and the outside surfaces of the parallel walls substantially define the second, differentially dimensioned, transversely and vertically disposed lower width, and the heated fluid entry port being positioned along the second lower width of the middle section adjacent to and above the second inner pin-channel of the shroud housing subassembly.

5. The improved windshield and windshield wiper heating apparatus assembly of claim 1,
wherein:
the second communications line of the pump subassembly means further comprises a first portion operatively connected to the pump subassembly means, a second portion operatively connected to the heated fluid entry port of the shroud housing subassembly and a coupling component for separating and operatively reconnecting said first and second portions so that the shroud housing subassembly can be removed and taken off line of the improved windshield and windshield wiper heating apparatus assembly for cleaning, servicing, and structural upgrading and adaptation as needed.

6. The improved windshield and windshield wiper heating apparatus assembly of claim 1,
wherein:
the heat exchanger subassembly means comprises a body member having outside and internal portions and an attachment member for mounting said heat exchanger subassembly means;
the internal portions of the body member of said heat exchanger subassembly means having a plurality of baffle members and defining an operative channel connecting the inboard communication line and the outboard communication line; and
the body member being contactably mounted on a manifold portion of the vehicle engine and secured thereto by the attachment member.

7. The improved windshield and windshield wiper heating apparatus assembly of claim 1,
wherein:
the heat exchanger subassembly means further comprises first and second ends, inside and outside surface portions, an internally defined chamber, and a core member mounted within the chamber between the inboard and outboard communication lines and having a plurlality of coiled fluid line components continuously connected therebetween for passage of the ambient fluid therethrough,
the first end defining an intake channel and the second end defining an exit channel each of which extends through the inside and outside surface portions and communicates with the core member, and
the intake and exit channels, each, respectively, being operatively and flowably installed on-line with a liquid fluid line from the vehicle engine such that a liquid fluid from the vehicle engine flows through the chamber and makes contact with the core member for convection current heating of the ambient fluid passing through said core member,
and wherein, the inboard commuinication line is further provided with a filter member for collecting, directing and filtering the ambient fluid entering said inboard communication line.

8. The improved windshield and windshield wiper heating apparatus assembly of claim 1,
wherein;
the heat exchanger subassembly means further comprises first and second side portions, inside and outside surface portions, an internally defined chamber, and a core member mounted within the chamber between the inboard and outboard communication lines and having a plurality of coiled fluid line components continuously connected therebetween for passage of the ambient fluid therethrough,
and wherein, said heat exchanger subassembly means is mounted on an exhaust pipe line of the vehicle engine.

9. An improved windshield and windshield wiper heating apparatus assembly for use in installable combination with a windshield wiper arm assembly, a flexible and pivotable wiper blade assembly, a pivotable wiper frame assembly, a vehicle windshield having outside and inside surfaces and a vehicle engine; the windshield wiper arm assembly being electrically activated and pivoted in relation to the outside surface of the windshield, and having at one end thereof a coupable flange member, the flange member having first and second projecting members and defining a flange space therebetween, and each of the projecting members defining a couple channel, axial with one another, and having a couple pin which is inserted through each of the couple channels when the windshield wiper arm assembly is inserted and installed, and when in inserted and installed position the couple pin is substantially parallel to the outside surface of the windshield; and the wiper blade assembly and wiper frame assembly each having at least a length component and a transverse width component, the transverse width component of the wiper frame assembly defining a pin connection channel which, when positioned lengthwise for installment, is substantially parallel to the outside surface of the windshield, the length component of the wiper blade and frame assemblies each having a middle portion and first and second lateral portions on either side thereof; said improved windshield and windshield wiper heating apparatus assembly comprising:

a open-ended shroud housing subassembly having a longitudinally oriented roof portion, a pair of opposing longitudinally positioned wall portions and a pair of opposing transversely positioned endwall portions, defining an arcuate open end opposite of said roof portion;

said roof portion having a middle section and adjoining first and second lateral sections, extending longitudinally on either side thereof;

said middle section having and defining a first transversely and vertically disposed upper width and a second, differentially dimensioned, transversely and vertically disposed lower width such that a shelf portion is defined transversely of a vertical axis of the lower width, the first and second lateral sections being concurrent and coextensive with, and between, the upper width of the middle section and each of the respective end wall portions;

said shroud housing defining a first inner pin-channel extending substantially transversely of a common vertical axis of the upper width of said middle section and the open end of the shroud housing, for receipt and installation of the coupable flange member of the windshield wiper arm assembly, said coupable flange member being inserted and installed on the upper width of said middle section such that the flange space is positioned about the upper width and the couple channels are in substantial axial alignment with the first inner pin-channel, the couple pin being inserted to fixedly connect in axial alignment the couple channels and first inner pin-channel, when the windshield wiper arm assembly is positioned for installment on the shroud housing subassembly;

said shroud housing subassembly further having and defining a second inner pin-channel, extending substantially transversely of a vertical axis of the lower width, and substantially parallel with the first inner pin channel, for alignment, during installation of the wiper frame assembly, with the pin connection channel of the transverse width component of the wiper frame assembly;

the shroud housing subassembly further comprising a wiper frame and blade connection pin, said pin being slideably and releasably installed, when the wiper frame assembly is in installable position, such that said pin registers and communicates with the second inner pin-channel of said shroud housing subassembly and the pin connection channel of the wiper frame assembly, so that the wiper frame and blade assemblies are movably and pivotably attached and installed within the opens ended shroud housing subassembly and pivotably responsive, rotationally, in weight-bearing relationship, about a axis of the frame and blade connection pin so registered, to a contour and configuration of the outside surface of the vehicle windshield, said shroud housing subassembly having and defining an inner installation channel operatively coextensive through the first upper width, the second lower width, the lateral sections, wall portions, endwall portions and open end, and through which the first and second inner pin-channels pass, and by, and within, which the wiper frame and blade assemblies are movably and releasably channeled and flexibly and pivotally connected; and a perforated duct means for providing heated fluid, mountably positioned within the inner installation channel, generally, transversely of and vertically between the first inner pin-channel and the second inner pin-channel of the middle section, and extending, on either side thereof, substantially along each of the first and second lateral sections of said roof portion such that it is positioned above and adjacent to the first and second lateral portions of the wiper frame assembly for fluid heating thereof within the inner installation channel, one of the pair of opposing longitudinally positioned wall portions of said open-ended shroud housing subassembly defining a heated fluid entry port, positioned adjacent to and proximally, vertically between the first and second inner pin-channels of the middle section, in channelable communication with said perforated duct means, for the communication and passage of a heated ambient fluid therethrough; and heating and pump assembly means for heating an ambient fluid with convection currents from the vehicle engine and directing the ambient fluid to the heated fluid entry port of the open-ended shroud housing subassembly, said heating and pump means comprising:

heat exchanger subassembly means mounted generally adjacent to a heat energy and convection current generating portion of the vehicle engine, for collecting and utilizing heating convection currents therefrom to heat the ambient fluid, said heat exchanger subassembly means having an inboard communication line for directing the ambient fluid into the heat exchanger subassembly means and an outboard communication line for directing the ambient fluid, after heating, out of the heat exchanger subassembly, and pump subassembly means for pulling the ambient fluid, after heating, from the heat exchanger, and directing the ambient fluid to the heated fluid entry port of the open-ended shroud housing subassembly, said pump subassembly means having a first communications line channelably connected to the outboard communication line of the heat exchanger subassembly means for directing the ambient fluid, after heating, from the heat exchanger subassembly means to the pump subassembly means, and a second communications line for directing the ambient fluid from the pump subassembly means to the heated fluid entry port of the open-ended shroud housing subassembly.

10. The improved windshield and windshield wiper heating apparatus assembly of claim 9, wherein:

said perforated duct means further comprises a channeled tubular line, said line defining a plurality of perforated aperture extension holes positionally oriented along either of said first and second lateral sections, within said inner installation channel, of ther roof portion, through which a heated ambient fluid can pass to heat the length components of the wiper frame and wiper blade assemblies and adjacent portions of the outside surface of the vehicle windshield.

11. An improved windshield and windshield wiper heating apparatus assembly for use in installable combination with a windshield wiper arm assembly, a flexible and pivotable wiper blade assembly, a pivotable wiper frame assembly, a vehicle windshield having outside and inside surfaces and a vehicle engine; the windshield wiper arm assembly being electrically activated and pivoted in relation to the outside surface of the windshield, and having at one end thereof a curved attachment loop member, defining a looped space opening proximal to the outside surface of the windshield when in a installed position, and having a width component substantially parallel to the outside surface of the windshield when in a installed position; and the wiper blade assembly and wiper frame assembly each having at least a length component and a transverse width component, the transverse width component of the wiper frame defining a pin connection channel which, when positioned lengthwise for installment, is substantially parallel to the outside surface of the windshield, the length component of the wiper blade and frame assemblies each having a middle portion and first and second lateral portions on either side thereof; said improved windshield and windshield wiper heating apparatus assembly comprising:

a open-ended shroud housing subassembly having a longitudinally oriented roof portion, a pair of opposing longitudinally positioned wall portions and a pair of opposing transversely positioned endwall portions, defining an arcuate open end opposite of said roof portion;

said roof portion having a middle section and adjoining first and second lateral sections, extending longitudinally on either side thereof;

said middle section having and defining a first transversely and vertically disposed upper width and a second, differentially dimensioned, transversely and vertically disposed lower width such that a shelf portion is defined transversely of a vertical axis of the lower width, the first and second lateral sections being concurrent and coextensive with, and between, the upper width of the middle section and each of the respective end wall portions;

said upper width having curved attachment means for securely and releasably installing the curved attachment loop member of the windshield wiper arm assembly and a biasable cover member releasably installed on and above the curved attachment means when the curved attachment loop member is in a installed position;

said shroud housing subassembly further having and defining an inner pin-channel, extending substantially transversely of a common vertical axis of the lower width of said middle section and the open end of the shroud housing subassembly, and generally centered and parallel with said curved attachment means, for alignment, during installation of the wiper frame assembly with the pin connection channel of the transverse width component of the wiper frame assembly;

the shroud housing subassembly further comprising a wiper frame and blade connection pin, said pin being installed, when the wiper frame assembly is in installable position, such that said pin registers with the inner pin-channel of said shroud housing subassembly and the pin connection channel of the wiper frame assembly, said shroud housing subassembly having and defining an inner installation channel operatively coextensive through the first upper width, the second lower width, the lateral sections, wall portions endwall portions and open end of said shroud housing subassembly, and through which the inner pin channel passes, and by, and within, which the wiper frame and blade assemblies are movably and releasably channeled and flexibly and pivotally connected; and a perforated duct means for providing heated fluid, mountably positioned within the inner installation channel, generally, transversely of and vertically adjacent to and above the inner pin-channel of the middle section, and extending, on either side thereof, substantially along each of the first and second lateral section of said roof portion such that it is positioned above and adjacent to the first and second lateral portions of the wiper frame assembly for fluid heating thereof within the inner installation channel, one of the pair of opposing longitudinally positioned wall portions of said open-ended shroud housing subassembly defining a heated fluid entry port, positioned adjacent to and proximally, vertically above the inner pin-channel of the middle section, in channelable communication with said perforated duct means, for communication and passage of a heated ambient fluid therethrough.

12. The improved windshield and windshield wiper heating apparatus assembly of claim 11,
wherein:
said improved windshield and windshield wiper heating apparatus assembly further comprises a heating and pump assembly means for heating an ambient fluid with convection currents from the vehicle engine and directing the ambient fluid to the heated fluid entry port of the open-ended shroud housing subassembly.

13. The improved windshield and windshield wiper heating apparatus assembly of claim 12,
wherein:
said heating and pump assembly means comprises:
a heat exchanger subassembly means mounted generally adjacent to a heat energy and convection current generating portion of the vehicle engine, for collecting and utilizing heating convection currents therefrom to heat the ambient fluid, said heat exchanger subassembly means having an inboard communication line for directing the ambient fluid into the heat exchanger subassembly means and an outboard communication line for directing the ambient fluid, after heating, out of the heat exchanger subassembly, and a pump subassembly means for pulling the ambient fluid, after heating, from the heat exchanger, and directing the ambient fluid to the heated fluid entry port of the open-ended shroud housing subassembly, said pump subassembly means having a first communications line channelably connected to the outboard communication line of the heat exchanger subassembly means for directing the ambient fluid, after heating, from the heat exchanger subassembly means to the pump subassembly means, and a second communications line for directing the ambient fluid from the pump subassembly means to the heated fluid entry port of the open-ended shroud housing subassembly.

14. The improved windshield and windshield wiper heating apparatus assembly of claim 13,
wherein:
said perforated duct means further comprises a channeled tubular line, said line defining a plurality of holes positionally oriented along either of said first and second lateral sections of the roof portion, within said inner installation channel, through which a heated ambient fluid can pass to heat the first and second lateral portions of the length component of the wiper blade and frame assemblies and adjacent portions of the outside surface of the vehicle windshield.

15. A improved windshield and windshield wiper heating apparatus for use in installable combination with a windshield wiper arm assembly, a flexible and pivotable wiper blade assembly and wiper frame assembly, a vehicle windshield having outside and inside surfaces and a vehicle engine; the windshield wiper arm assembly being electrically activated and pivoted in relation to the outside surface of the windshield, and having at one end thereof a wiperarm pin member which moves in adjacent relation with the outside surface when the wiper arm is activated and pivoted; and the wiper blade and frame assemblies each having at least a length component and a transverse width component, the transverse width component of the wiper blade frame assembly defining a pin connection channel; the length component of the wiper blade and frame assemblies each having a middle portion and first and second lateral portions on either side thereof; said improved windshield and windshield wiper heating apparatus comprising:

a open-ended shroud housing having a longitudinally oriented roof portion, a pair of opposing longitudinally positioned wall portions and a pair of opposing transversely positioned endwall portions, defining an arcuate open end opposite of said roof portion, said roof portion having a middle section and adjoining first and second lateral sections, extending longitudinally on either side thereof, said middle section having and defining a first transversely and vertically disposed upper width and a second, differentially dimensioned, transversely and vertically disposed lower width such that a shelf portion is defined transversely of a vertical axis of the lower width, the first and second lateral sections being concurrent and coextensive with, and between, the upper width of the middle section and each of the respective end wall portions, said shroud housing defining a first inner pin-channel extending substantially transversely of a common vertical axis of the upper width of said middle section and the open end, for receipt and installation of the wiperarm pin member, said wiperarm pin member being inserted through and rotatably and pivotably attached to the upper width of the middle section of said shroud housing, such that the shroud housing can pivot in response to motion when the windshield wiper arm is movably activated, and can respond positionally to weight bearing stress generated by the outside surface of the windshield and an installed windshield wiper blade assembly and wiper frame assembly in contact with the windshield, said shroud housing further having and defining a second inner pin-channel, extending substantially transversely of a vertical axis of the lower width, and substantially parallel with the first inner pin-channel, for alignment, during installation of the wiper blade and wiper frame assemblies, with the pin connection channel of the transverse width component of the wiper frame assembly, the shroud housing subassembly further comprising a wiper frame and blade connection pin, said pin being slideably and releasably installed, when the wiper blade and frame assembly is in installable position, such that said pin registers and communicates with the second inner pin-channel of said shroud housing and the pin connection channel of the wiper frame assembly, so that the wiper blade and wiper frame assemblies are movably and pivotably attached and installed within the open-ended shroud housing and pivotably responsive, rotationally, in weight-bearing relationship, about a axis of the frame and blade connection pin so registered, to a contour and configuration of the outside surface of the vehicle windshield, said shroud housing subassembly having and defining a inner installation channel operatively coextensive through the first upper width, the second lower width, the lateral sections, wall portions, endwall portions and open end, and through which the first and second inner pin-channels pass, and by, and within, which the wiper blade and wiper frame assemblies are movably and releasably channeled and flexibly and pivotally connected; and a perforated duct means for providing heated fluid, mountably positioned within the inner installation channel, generally, transversely of and vertically between the first inner pin-channel and the second inner pin-channel of the middle section, and extending, on either side thereof, substantially along each of the first and second lateral sections such that it is positioned above and adjacent to the first and second lateral portions of the wiper frame and wiper blade assemblies for fluid heating thereof within the inner installation channel, and one of the pair of opposing longitudinally positioned wall portions of said open-ended shroud housing defining a heated fluid entry port, positioned adjacent to and proximally, vertically between the first and second inner pin-channels of the middle section, in channelable communication with said perforated duct means, for the communication and passage of a heated ambient fluid therethrough.

16. The improved windshield and windshield wiper heating apparatus of claim 15,
wherein:
said improved windshield and windshield wiper heating apparatus further comprises a heating and pump assembly means for heating an ambient fluid with convection currents from the vehicle engine and directing the ambient fluid to the heated fluid entry port of the open-ended shroud housing.

17. The improved windshield and windshield wiper heating apparatus of claim 16,
wherein:
said heating and pump means comprises:
a heat exchanger subassembly means mounted generally adjacent to a heat energy and convection current generating portion of the vehicle engine, for collecting and utilizing heating convection currents therefrom to heat the ambient fluid, said heat exchanger subassembly means having an inboard communication line for directing the ambient fluid into the heat exchanger subassembly means and a outboard communication line for directing the ambient fluid, after heating, out of the heat exchanger subassembly, and
a pump subassembly means for pulling the ambient fluid, after heating, from the heat exchanger, and directing the ambient fluid to the heated fluid entry port of the open-ended shroud housing, said pump subassembly means having a first communications line channelably connected to the outboard communication line of the heat exchanger subassembly means for directing the ambient fluid, after heating, from the heat exchanger subassembly means to the pump subassembly means, and a second communications line for directing the ambient fluid from the pump subassembly means to the heated fluid entry port of the open-ended shroud housing.

18. The improved windshield and windshield wiper heating apparatus of claim 17,
wherein:
said perforated duct means further comprises a channeled alloy fluid conduction line, said fluid conduction line defining a plurality of holes positionally spaced along either of said first and second lateral sections of the roof portion, within the installation channel, through which a heated ambient fluid passes to heat the wiper frame and wiper blade assemblies, and adjacent portions therebelow on the outside surface of the vehicle windshield.

19. The improved windshield and windshield wiper heating apparatus of claim 18,
wherein:
each of the plurality of holes of said perforated duct means faces and is positionally most proximal to an adjoining area vertically above the wiper frame assembly when said wiper frame assembly is in installed position within the shroud housing.

20. The improved windshield and windshield wiper heating apparatus of claim 19,
wherein:
said heating and pump means further comprises a secondary variable heat exchanger subassembly positioned on-line between the heat exchanger subassembly and the pump subassembly for providing additional variable heating to the ambient fluid as it passes and is conducted and directed between the heat exchanger subassembly and the pump subassembly; and a couple member positioned on the secondary communications line for optional disconnection and separation of said line for removal of the shroud housing subassembly.

21. The improved windshield and windshield wiper heating apparatus of claim 20, wherein:
said secondary variable heat exchanger subassembly is a variable electrical resistance heating device;
and wherein:
said heating and pump means further comprises a filter subassembly positioned on-line before the heat exchanger subassembly and connected to the inboard communication line of the heat exchanger subassembly for cleaning and filtering the ambient fluid as it enters the heating and pump means.

* * * * *